United States Patent
Ago et al.

(10) Patent No.: US 11,386,109 B2
(45) Date of Patent: *Jul. 12, 2022

(54) SHARING CONFIGURATION INFORMATION THROUGH A SHARED STORAGE LOCATION

(71) Applicant: SPLUNK INC., San Francisco, CA (US)

(72) Inventors: Ledio Ago, Oakland, CA (US); Declan Gerard Shanaghy, Benicia, CA (US)

(73) Assignee: Splunk Inc., San Francisco, CA (US)

(*) Notice: Subject to any disclaimer, the term of this patent is extended or adjusted under 35 U.S.C. 154(b) by 80 days.

This patent is subject to a terminal disclaimer.

(21) Appl. No.: 16/259,837

(22) Filed: Jan. 28, 2019

(65) Prior Publication Data
US 2019/0188208 A1 Jun. 20, 2019

Related U.S. Application Data

(63) Continuation of application No. 14/526,500, filed on Oct. 28, 2014, now Pat. No. 10,235,460.
(Continued)

(51) Int. Cl.
G06F 16/27 (2019.01)
G06F 16/25 (2019.01)
(Continued)

(52) U.S. Cl.
CPC .......... *G06F 16/254* (2019.01); *G06F 16/215* (2019.01); *G06F 16/2228* (2019.01);
(Continued)

(58) Field of Classification Search
CPC ...... G06F 16/254; G06F 16/27; G06F 16/215; G06F 16/2228; G06F 16/951;
(Continued)

(56) References Cited

U.S. PATENT DOCUMENTS 7,139,894 B1 11/2006 Mensching et al.
7,937,344 B2 5/2011 Baum et al.
(Continued)

OTHER PUBLICATIONS

Bitincka et al. "Experiences with Workload Management in Splunk", Copyright 2012 ACM, Sep. 21, 2012, 6 pages.
(Continued)

*Primary Examiner* — Kris E Mackes
*Assistant Examiner* — Tiffany Thuy Bui
(74) *Attorney, Agent, or Firm* — Shook, Hardy & Bacon L.L.P.

(57) ABSTRACT

Various embodiments describe multi-site cluster-based data intake and query systems, including cloud-based data intake and query systems. Using a hybrid search system that includes cloud-based data intake and query systems working in concert with so-called "on-premises" data intake and query systems can promote the scalability of search functionality. In addition, the hybrid search system can enable data isolation in a manner in which sensitive data is maintained "on premises" and information or data that is not sensitive can be moved to the cloud-based system. Further, the cloud-based system can enable efficient leveraging of data that may already exist in the cloud.

30 Claims, 26 Drawing Sheets

Related U.S. Application Data

(60) Provisional application No. 62/058,003, filed on Sep. 30, 2014.

(51) Int. Cl.

| | | |
|---|---|---|
| *H04W 4/60* | (2018.01) | |
| *G06F 16/951* | (2019.01) | |
| *H04L 67/10* | (2022.01) | |
| *G06F 16/215* | (2019.01) | |
| *G06F 16/22* | (2019.01) | |
| *G06F 16/2455* | (2019.01) | |
| *H04L 9/40* | (2022.01) | |

(52) U.S. Cl.
CPC ........ *G06F 16/24564* (2019.01); *G06F 16/27* (2019.01); *G06F 16/951* (2019.01); *H04L 63/029* (2013.01); *H04L 67/10* (2013.01); *H04W 4/60* (2018.02)

(58) Field of Classification Search
CPC .. G06F 16/24564; H04W 4/60; H04L 63/029; H04L 67/10
See application file for complete search history.

(56) References Cited

U.S. PATENT DOCUMENTS

| | | |
|---|---|---|
| 7,949,711 B2 | 5/2011 | Chang et al. |
| 8,112,425 B2 | 2/2012 | Baum et al. |
| 8,352,941 B1 | 1/2013 | Protopopov et al. |
| 8,412,696 B2 | 4/2013 | Zhang et al. |
| 8,589,403 B2 | 11/2013 | Marquardt et al. |
| 8,682,925 B1 | 3/2014 | Marquardt et al. |
| 8,706,798 B1 | 4/2014 | Suchter et al. |
| 8,751,529 B2 | 6/2014 | Zhang et al. |
| 8,788,459 B2 | 7/2014 | Patel et al. |
| 8,788,525 B2 | 7/2014 | Neels et al. |
| 8,826,434 B2 | 9/2014 | Merza |
| 9,124,612 B2 | 9/2015 | Vasan et al. |
| 9,130,971 B2 | 9/2015 | Vasan et al. |
| 9,160,798 B2 | 10/2015 | Patel et al. |
| 9,215,240 B2 | 12/2015 | Merza et al. |
| 9,286,413 B1 | 3/2016 | Coates et al. |
| 9,495,434 B1* | 11/2016 | Walton .................. G06F 16/178 |
| 9,811,549 B2 | 11/2017 | Schreter et al. |
| 9,990,423 B2 | 6/2018 | Ago et al. |
| 10,127,258 B2 | 11/2018 | Lamas et al. |
| 10,157,347 B1 | 12/2018 | Kasturi et al. |
| 10,235,460 B2 | 3/2019 | Ago et al. |
| 10,574,548 B2 | 2/2020 | Coates et al. |
| 2004/0030741 A1 | 2/2004 | Wolton et al. |
| 2005/0065958 A1 | 3/2005 | Dettinger et al. |
| 2005/0138111 A1* | 6/2005 | Aton .................. G06F 11/3476 709/201 |
| 2007/0209080 A1* | 9/2007 | Ture ..................... G06F 16/951 726/28 |
| 2008/0177839 A1 | 7/2008 | Chang et al. |
| 2009/0241192 A1* | 9/2009 | Thomas ................ G06F 21/577 726/23 |
| 2009/0271412 A1 | 10/2009 | Lacapra et al. |
| 2010/0150149 A1* | 6/2010 | Morrison .......... H04M 3/42272 370/389 |
| 2010/0306775 A1 | 12/2010 | Appiah et al. |
| 2011/0023104 A1* | 1/2011 | Franklin .............. G06Q 10/025 726/11 |
| 2011/0213753 A1 | 9/2011 | Manmohan |
| 2013/0047165 A1 | 2/2013 | Goetz et al. |
| 2013/0246625 A1 | 9/2013 | Vendrow |
| 2013/0318242 A1 | 11/2013 | Srinivasa |
| 2013/0332484 A1 | 12/2013 | Gajic |
| 2013/0339510 A1 | 12/2013 | Douglas et al. |
| 2014/0047342 A1 | 2/2014 | Breternitz et al. |
| 2014/0082749 A1 | 3/2014 | Holland et al. |
| 2014/0143854 A1* | 5/2014 | Lopez ................. H04L 63/0218 726/14 |
| 2014/0160238 A1 | 6/2014 | Yim et al. |
| 2014/0181048 A1 | 6/2014 | Varadharajan et al. |
| 2014/0282453 A1 | 9/2014 | O'Rourke et al. |
| 2014/0324862 A1 | 10/2014 | Bingham et al. |
| 2014/0330948 A1 | 11/2014 | Dunn et al. |
| 2015/0112996 A1 | 4/2015 | Mishra et al. |
| 2015/0121061 A1 | 4/2015 | Goyal et al. |
| 2016/0043892 A1 | 2/2016 | Hason et al. |
| 2016/0055225 A1* | 2/2016 | Xu ....................... H04L 67/1097 707/624 |
| 2016/0359806 A1 | 12/2016 | Lopez et al. |
| 2018/0095671 A1* | 4/2018 | Buzzard ................ G06F 3/0617 |
| 2018/0246957 A1 | 8/2018 | Ago et al. |
| 2019/0098106 A1 | 3/2019 | Mungel et al. |

OTHER PUBLICATIONS

"VSphere Monitoring and Performance," Update 1, vSphere 5.5, EN-001357-00, accessed at https://web.archive.org/web/20140913043828/http://pubs.vmware.com/vsphere-55/topic/com.vmware.ICbase/PDF/vsphere-esxi-vcenter-server-551-monitoring-performance-guide.pdf, accessed on Sep. 9, 2019, pp. 174.

Incident Review dashboard, User Manual, Splunk® App for PCI Compliance, Version 2.1.1, accessed at http://docs.splunk.com/Documentation/PCI/2.1.1/User/IncidentReviewdashboard, accessed on Sep. 9, 2019, pp. 2.

Bitincka, Ledion, et al., "Optimizing Data Analysis with a Semi-Structured Time Series Database", splunk Inc., 2010 pp. 1-9.

Carasso, David, "Exploring Splunk," Search Processing Language (SPL) Primer and Cookbook, p. 156 (Apr. 2012).

Splunk Cloud 8.0.2004 User Manual, available online, retrieved May 20, 2020 from docs.splunk.com, pp. 1-66.

Splunk Enterprise 8.0.0 Overview, available online, retrieved May 20, 2020 from docs.splunk.com, pp. 1-17.

Splunk Quick Reference Guide, updated 2019, available online at https://www.splunk.com/pdfs/solution-guides/splunk-quick-reference-guide.pdf, retrieved May 20, 2020, pp. 1-6.

* cited by examiner

500

Original Search: 501
search "error | stats count BY host

Sent to peers: 502
search "error | prestats count BY host (map)

Executed by search head: 503
Merge prestats results received from peers (reduce)

FIG. 6A

| Data Su ary | | | |
|---|---|---|---|
| Hosts ( ) | Sources (8) | Sourcetypes (3) | × |
| filter | | | |
| Host ◇ | | Count ◇ | La Update ◇ |
| mailsv | ◇ | 9,829 | 4/29/14 1:32:47. PM |
| vendor_sales | ◇ | 3 ,244 | 4/29/14 1:32:46. PM |
| www1 | ◇ | 24,221 | 4/29/14 1:32:44. PM |
| www2 | ◇ | 22, 9 | 4/29/14 1:32:47. PM |
| www3 | ◇ | 22,97 | 4/29/14 1:32:4 . PM |

SHARING CONFIGURATION INFORMATION THROUGH A SHARED STORAGE LOCATION

CROSS-REFERENCE TO RELATED APPLICATIONS

This application is a Continuation of U.S. patent application Ser. No. 14/526,500 filed Oct. 28, 2014 and titled "Sharing Configuration Information for Searches in Data Intake and Query Systems", which itself claims priority under 35 U.S.C. Section 119(e) as a non-provisional application of U.S. Provisional Application No. 62/058,003, filed Sep. 30, 2014, and titled "Sharing Configuration Information for Searches in Data Intake and Query Systems", the disclosure of which are hereby incorporated by reference in their entirety.

BACKGROUND

Businesses and their data analysts face the challenge of making sense of and finding patterns in the increasingly large amounts of data in the many types and formats that such businesses generate and collect. For example, accessing computer networks and transmitting electronic communications across the networks generates massive amounts of data, including such types of data as machine data and Web logs. Identifying patterns in this data, once thought relatively useless, has proven to be of great value to the businesses. In some instances, pattern analysis can indicate which patterns are normal and which ones are unusual. For example, detecting unusual patterns can allow a computer system manager to investigate the circumstances and determine whether a computer system security threat exists.

Additionally, analysis of the data allows businesses to understand how their employees, potential consumers, and/or Web visitors use the company's online resources. Such analysis can provide businesses with operational intelligence, business intelligence, and an ability to better manage their IT resources. For instance, such analysis may enable a business to better retain customers, meet customer needs, or improve the efficiency of the company's IT resources. Despite the value that one can derive from the underlying data described, making sense of this data to realize that value takes effort. In particular, patterns in underlying data may be difficult to identify or understand when analyzing specific behaviors in isolation, often resulting in the failure of a data analyst to notice valuable correlations in the data from which a business can draw strategic insight.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

The various embodiments describe multi-site cluster-based data intake and query systems, including cloud-based data intake and query systems. Using a hybrid search system that includes cloud-based data intake and query systems working in concert with so-called "on-premises" data intake and query systems can promote the scalability of search functionality. In addition, the hybrid search system can enable data isolation in a manner in which sensitive data is maintained "on premises" and information or data that is not sensitive can be moved to the cloud-based system. Further, the cloud-based system can enable efficient leveraging of data that may already exist in the cloud.

In addition, various embodiments enable configuration data associated with search functionality to be shared amongst clusters in a manner that promotes cluster security. Specifically, a shared data store can be utilized to store configuration information such that when a particular cluster wishes to use the configuration information, it simply retrieves the configuration information from the shared data store, thus avoiding direct communication with other clusters.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 6A illustrates a search screen in accordance with the disclosed implementations.

FIG. 6B illustrates a data summary dialog that enables a user to select various data sources in accordance with the disclosed implementations.

FIG. 7B illustrates an incident review dashboard in accordance with the disclosed implementations.

FIG. 7D illustrates a screen displaying both log data and performance data in accordance with the disclosed implementations.

DETAILED DESCRIPTION

Overview

Figure 1:
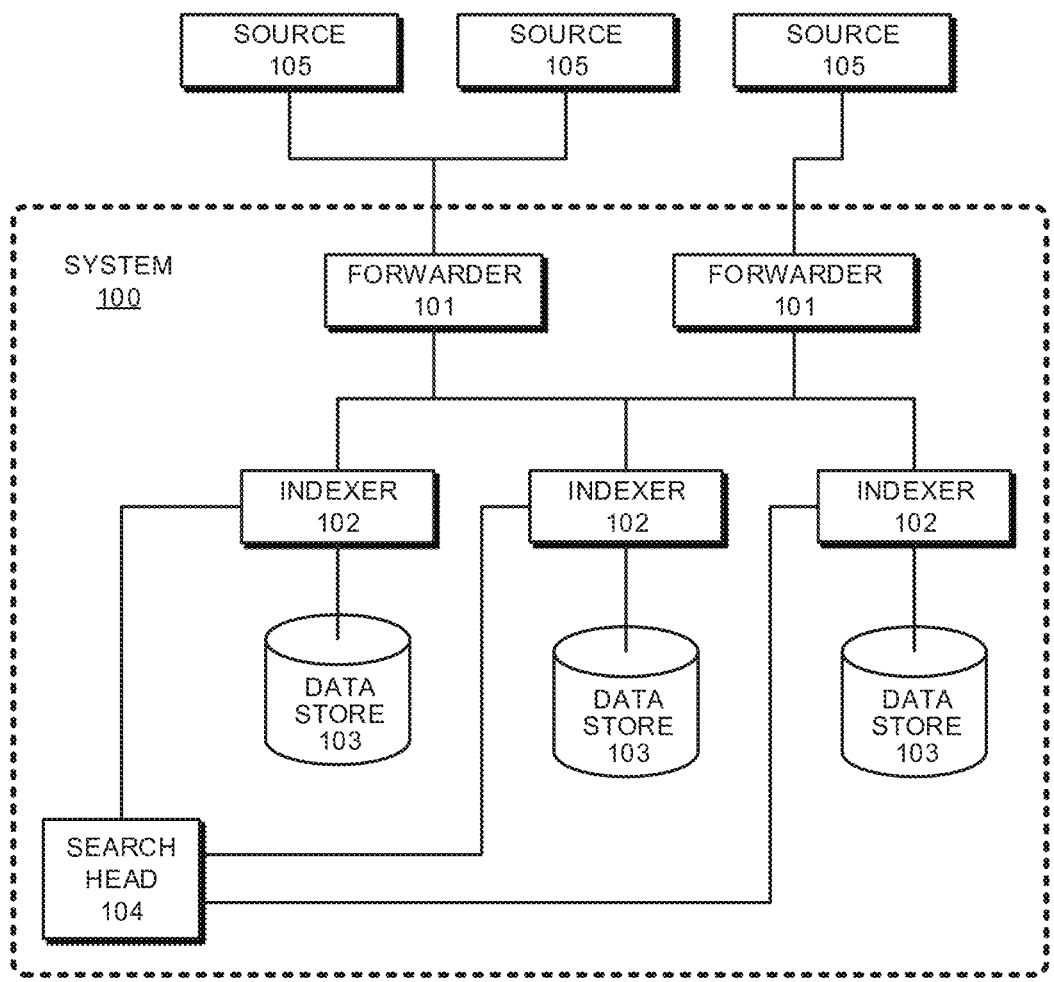
FIG. 1 presents a block diagram of an event-processing system in accordance with the disclosed implementations.

The various embodiments describe multi-site cluster-based data intake and query systems, including cloud-based data intake and query systems. Using a hybrid search system that includes cloud-based data intake and query systems working in concert with so-called "on-premises" data intake and query systems can promote the scalability of search functionality. In addition, the hybrid search system can enable data isolation in a manner in which sensitive data is maintained "on premises" and information or data that is not sensitive can be moved to the cloud-based system. Further, the cloud-based system can enable efficient leveraging of data that may already exist in the cloud.

In addition, various embodiments enable configuration data associated with search functionality to be shared amongst clusters in a manner that promotes cluster security. Specifically, a shared data store can be utilized to store configuration information such that when a particular cluster wishes to use the configuration information, it simply retrieves the configuration information from the shared data store, thus avoiding direct communication with other clusters.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," in which each event comprises a collection of performance data and/or diagnostic information that is generated by a computer system and is correlated with a specific point in time. Events can be derived from "time series data," in which time series data includes a sequence of data points (e.g., performance measurements from a computer system) that are associated with successive points in time and are typically spaced at uniform time intervals. Events can also be derived from "structured" or "unstructured" data. Structured data has a predefined format, in which specific data items with specific data formats reside at predefined locations in the data. For example, structured data can include data items stored in fields in a database table. In contrast, unstructured data does not have a predefined format. This means that unstructured data can include various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, in which the flexible schema may be developed and redefined as needed. Note that a flexible schema may be applied to event data "on the fly" as desired (e.g., at search time), rather than at ingestion time of the data as in traditional database systems. Because the schema is not applied to event data until it is desired (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule includes a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, in which each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
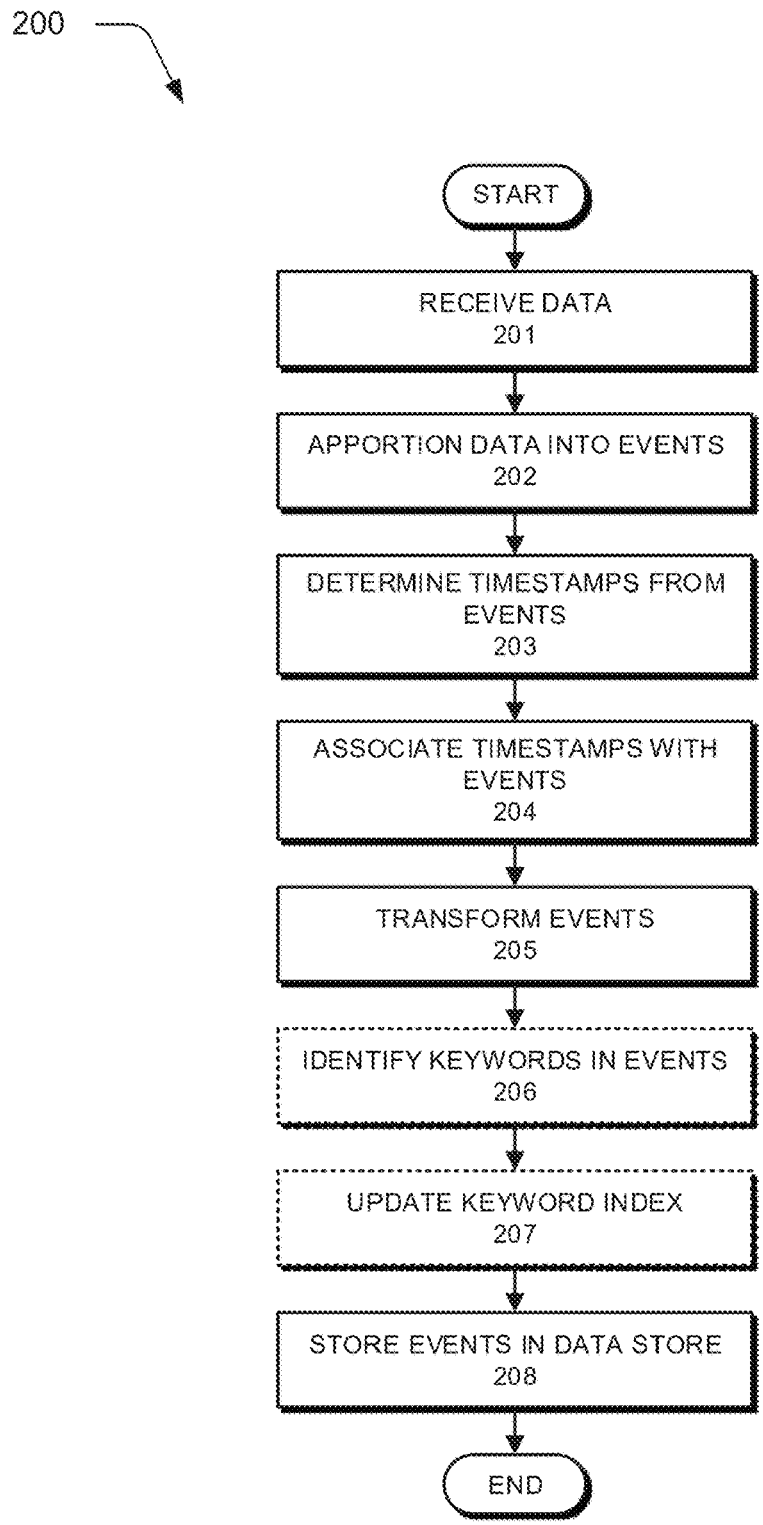
FIG. 2 presents a flowchart illustrating how indexers process, index, and store data received from forwarders in accordance with the disclosed implementations.

FIG. 2 presents a flowchart 200 illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, in which the indexer can be explicitly informed about the source of the data or can infer the source of the data by examining the data. These heuristic rules can include regular expression-based rules or delimiter-based rules for determining event boundaries, in which the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, in which each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

1.4 Query Processing

Figure 3:
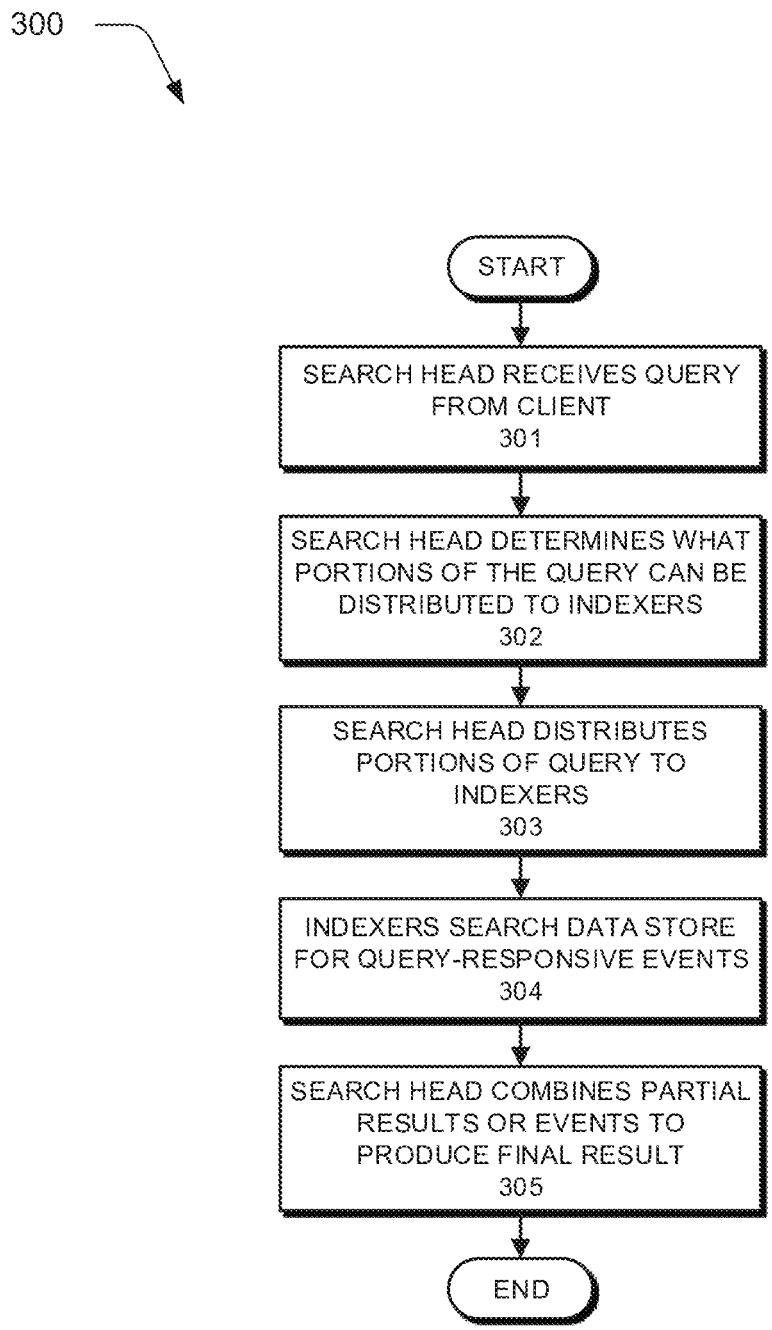
FIG. 3 presents a flowchart illustrating how a search head and indexers perform a search query in accordance with the disclosed implementations.

FIG. 3 presents a flowchart 300 illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
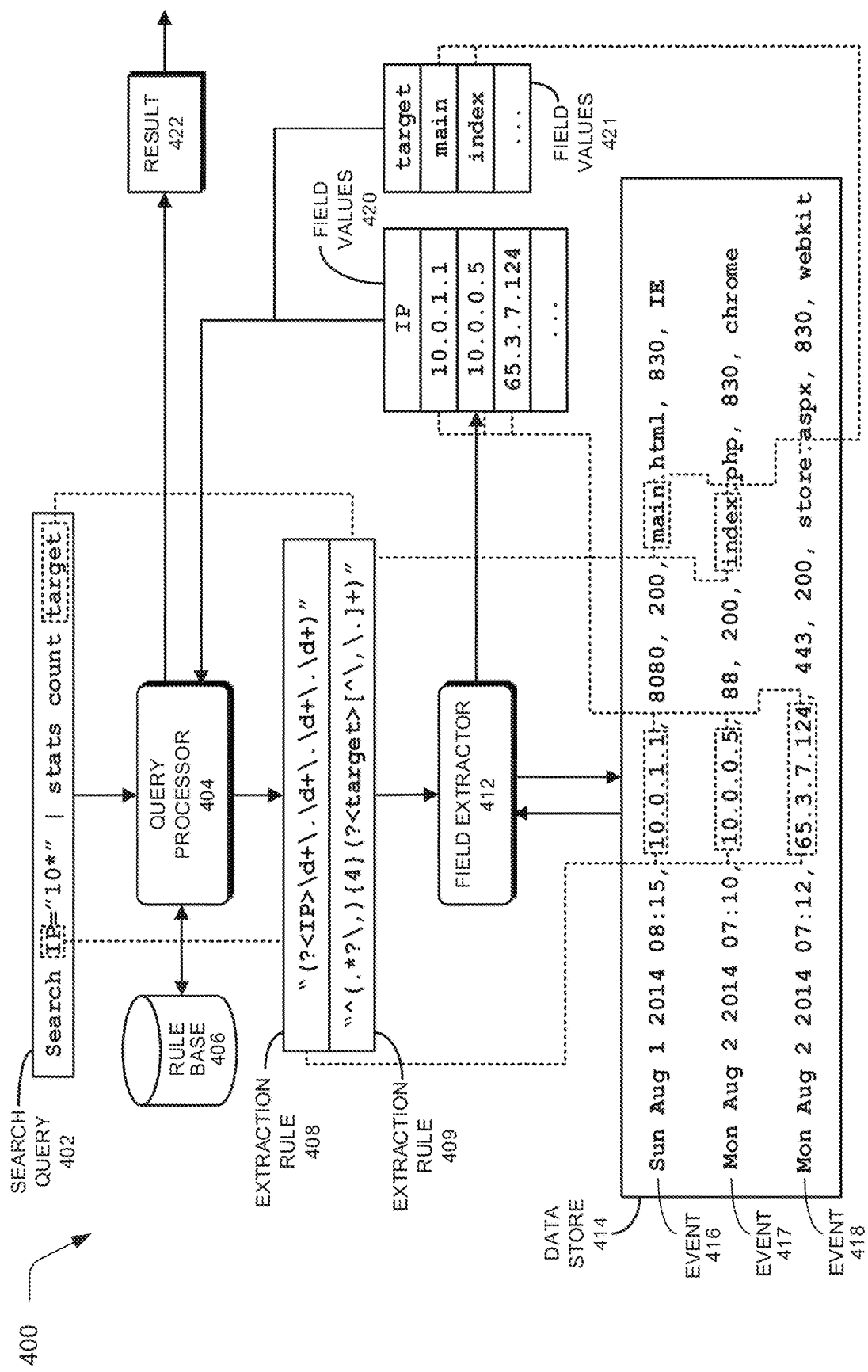
FIG. 4 presents a block diagram of a system for processing search requests that uses extraction rules for field values in accordance with the disclosed implementations.

FIG. 4 presents a block diagram 400 illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, in which rule base 406 maps field names to corresponding extraction rules and obtains extraction rules 408-409, extraction rule 408 specifies how to extract a value for the "IP" field from an event, and extraction rule 409 specifies how to extract a value for the "target" field from an event. As is illustrated in FIG. 4, extraction rules 408-409 can include regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 6A:
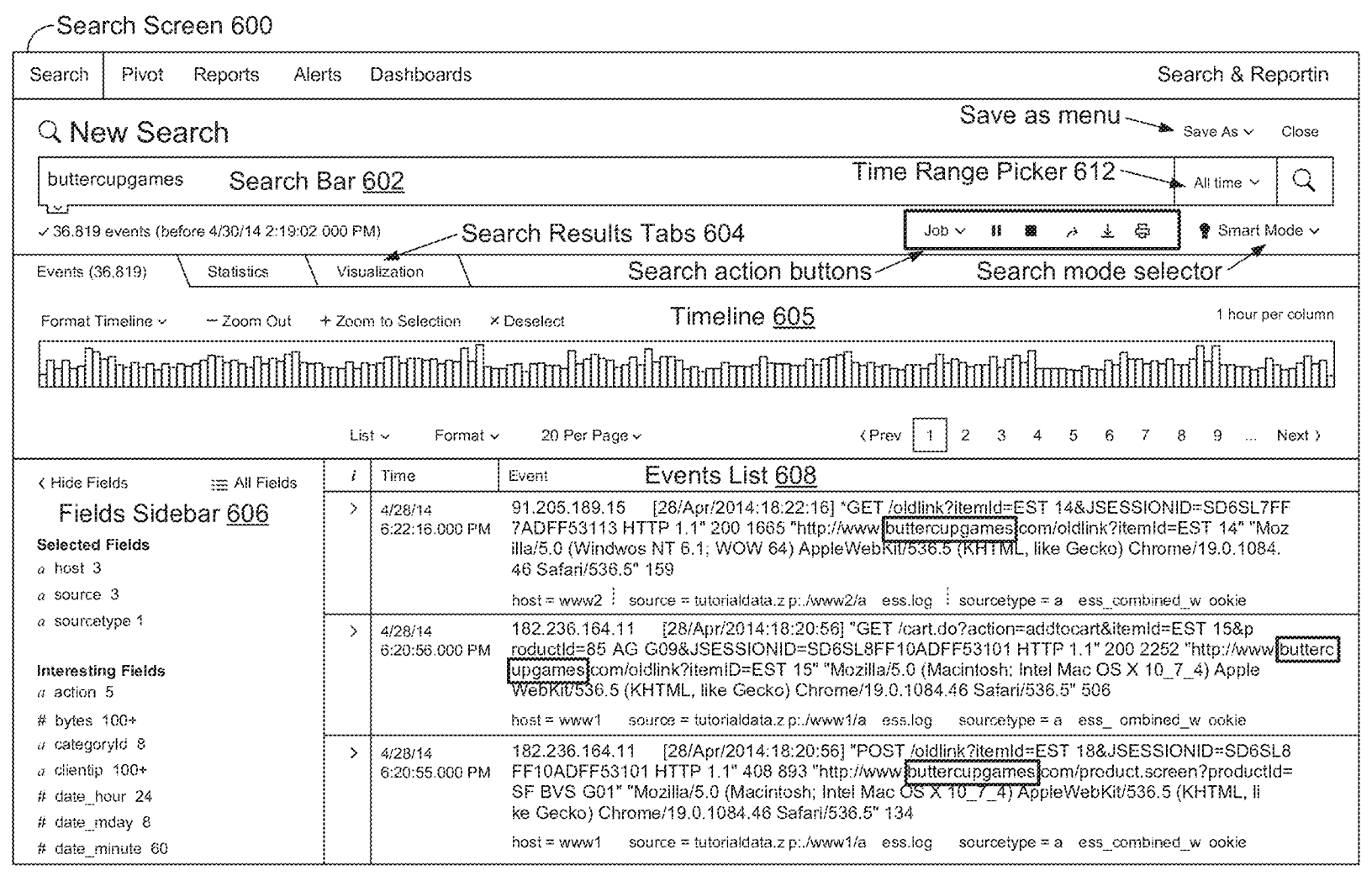

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

Figure 5:
FIG. 5 illustrates an exemplary search query received from a client and executed by search peers in accordance with the disclosed implementations.

To facilitate faster query processing, a query can be structured as a map-reduce computation, wherein the "map" operations are delegated to the indexers, while the corresponding "reduce" operations are performed locally at the search head. For example, FIG. 5 illustrates an example 500 of how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts 200, 300 in FIGS. 2 and 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process each of the events that have a specific field-value combination, the system can use the references in the summarization table entry to directly access the events to extract further information without having to search each of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, in which the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover each of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 7A:
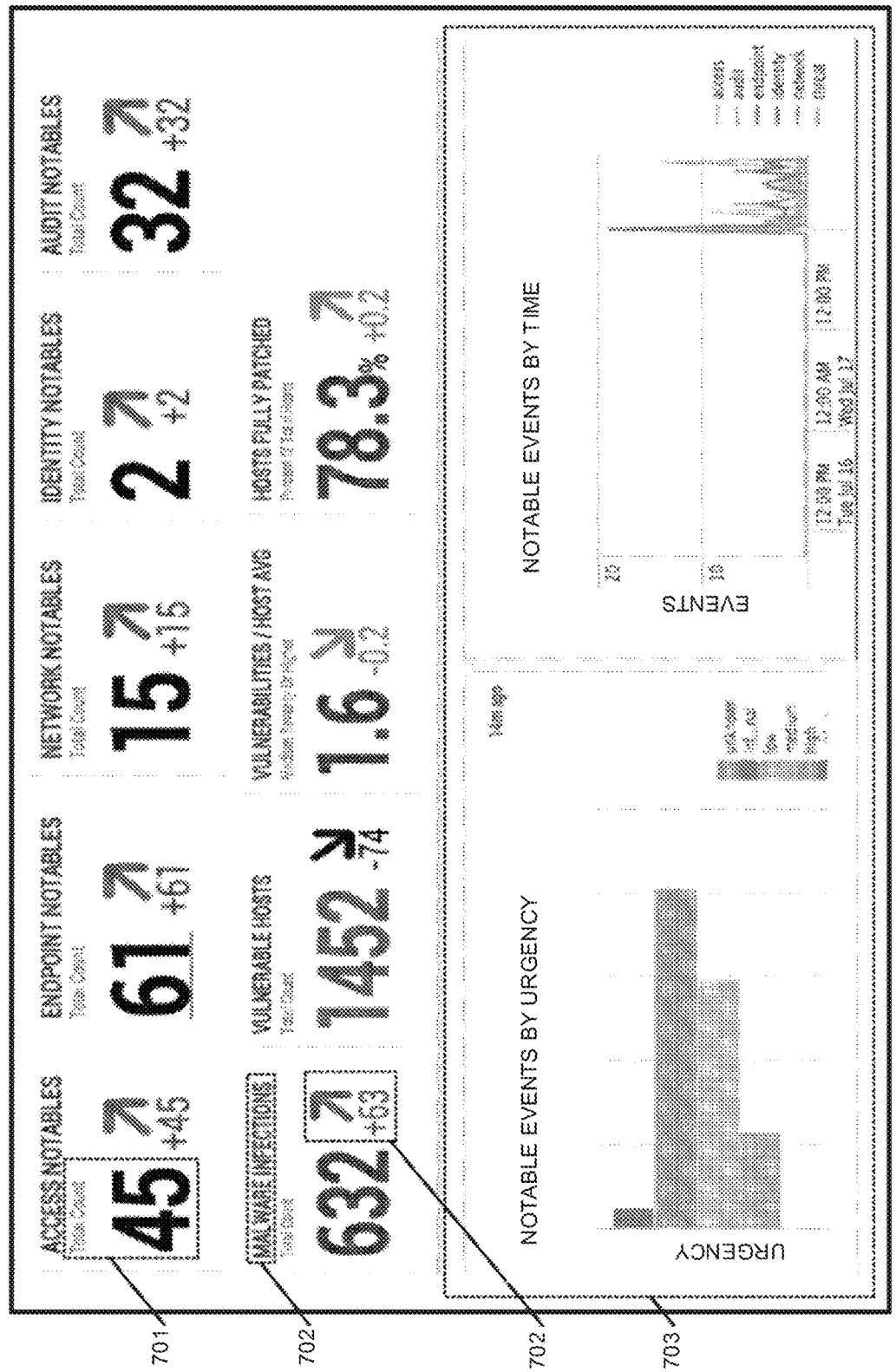
FIG. 7A illustrates a key indicators view in accordance with the disclosed implementations.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 7A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 7B:
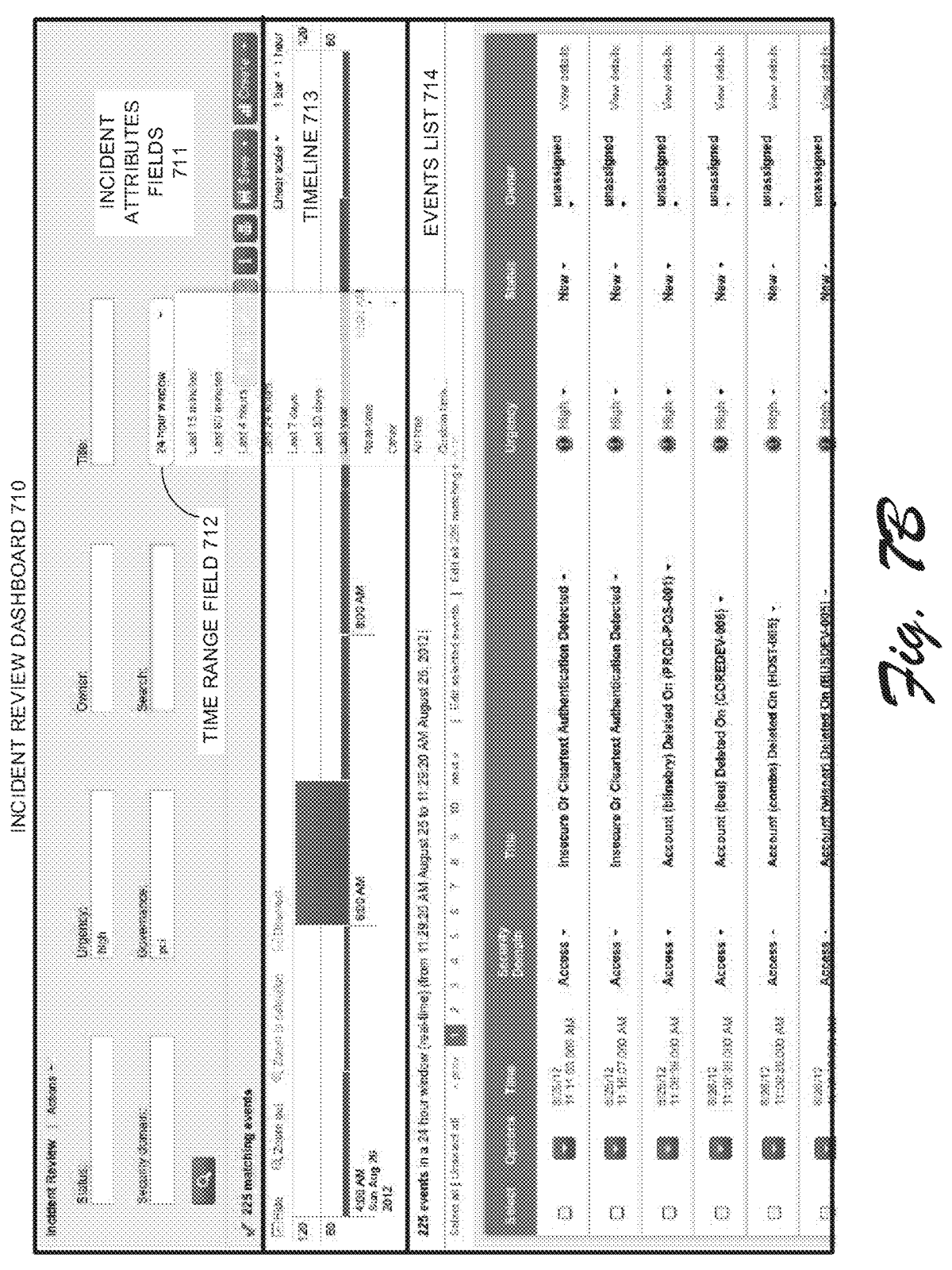

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 7B illustrates an exemplary incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of each of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. Pat. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 7C:
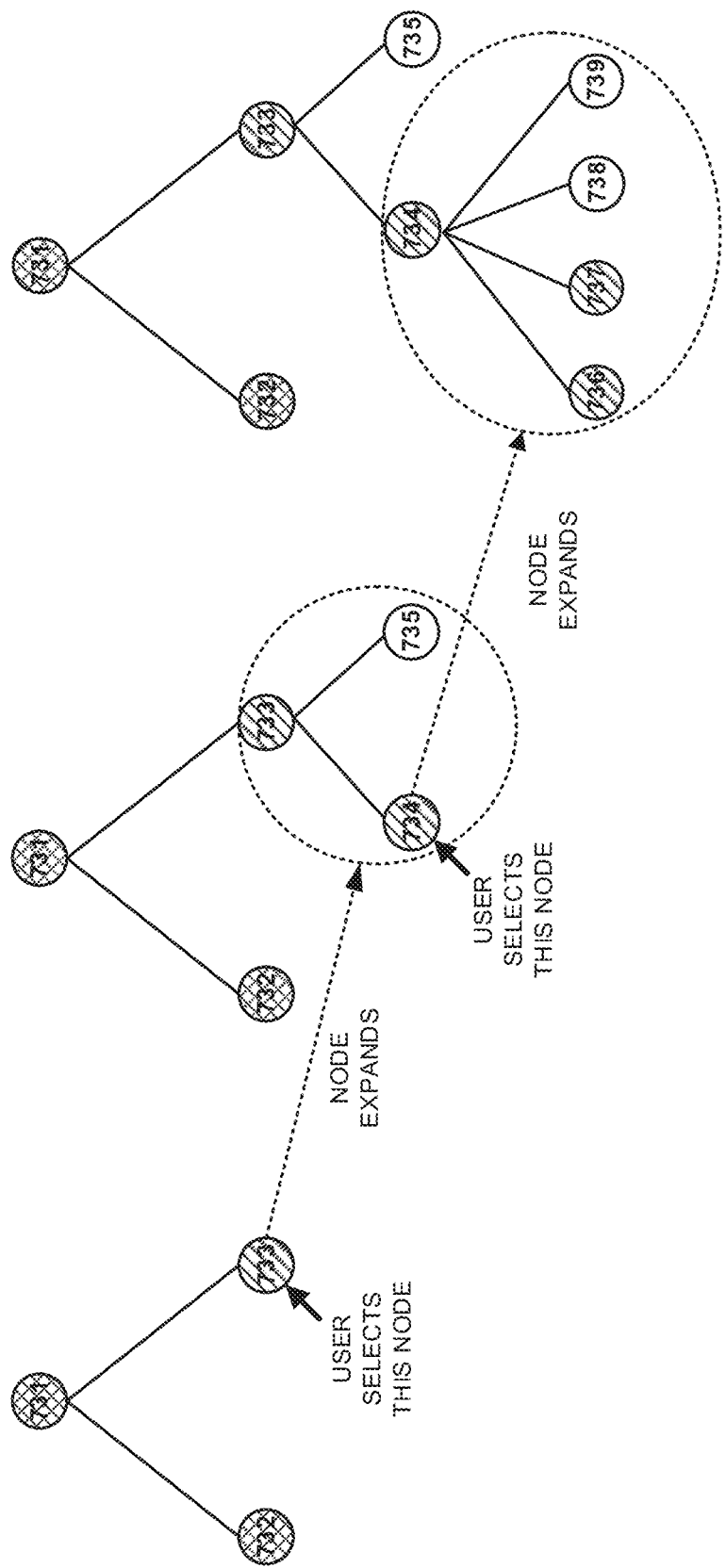
FIG. 7C illustrates a proactive monitoring tree in accordance with the disclosed implementations.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 7C, wherein nodes 733 and 734 are selectively expanded. Note that nodes 731-739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 7D:
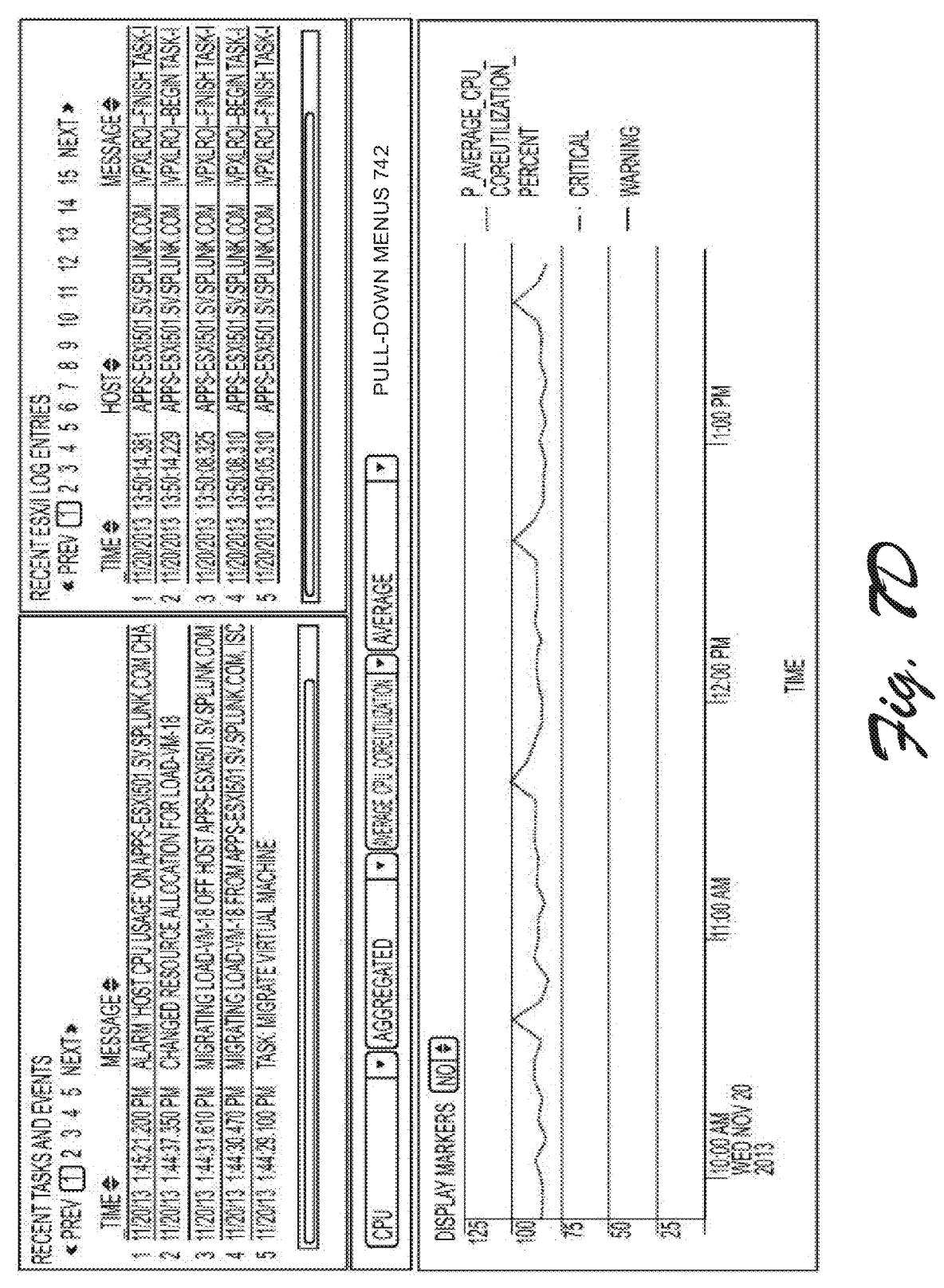

The SPLUNK® APP FOR VMWARE® also provides a user interface that enables a user to select a specific time range and then view heterogeneous data, comprising events, log data and associated performance metrics, for the selected time range. For example, the screen illustrated in FIG. 7D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

2.0 Clustered Operating Environment

It should be appreciated that, to achieve high availability and to provide for disaster recovery of data stored in a system such as the data intake and query system illustrated in FIG. 1, the system may be configured to operate as a cluster. A clustered data intake and query system as described herein generally may include multiple system components (e.g., forwarders, indexers, data stores, and/or search heads) configured to operate together in a coordinated fashion. To provide for high availability and disaster recovery in a clustered system, data processed and stored by an indexer in a data store may be replicated across one or more other indexers and data stores of the cluster according to a user configurable data replication policy. In one embodiment, a specialized cluster component, referred to herein as a master node, may be configured to coordinate various aspects of replicating data across data stores of the cluster and performing searches against data that has been replicated in a cluster. There are many options for how data may be replicated in a cluster and, in one embodiment, the manner in which data is replicated in a particular cluster may be based in part on a user configurable data replication policy. One configurable component of a data replication policy may be referred to as a "replication factor." The replication factor for a cluster is a value indicating a number of copies of each data subset, or bucket, created by an indexer that are to be stored across other indexers and in separate data stores of the cluster. For example, a cluster configured with a replication factor of two (2) indicates that for each data bucket created by an indexer, one additional copy of the bucket is to be created and stored by a different indexer of the cluster. Similarly, a cluster configured with a replication factor of four (4) indicates that each data bucket created by an indexer is to be replicated by three additional indexers of the cluster. In this manner, a cluster configured with a particular replication factor generally can tolerate a concurrent failure of a number of indexers that is one less than the replication factor.

As indicated above, when an indexer receives data from a forwarder, the indexer may store the data in one or more grouped subsets, or buckets, each corresponding to a time range associated with the data in the bucket. Each bucket created by an indexer may contain at least two types of files: event data extracted from the raw data and, optionally, a key word index that enables searches to be performed on the event data. In one embodiment, each replicated copy of a bucket created according to a data replication policy may either be searchable, meaning the bucket includes a copy of the key word index, or non-searchable, meaning the bucket includes only a copy of the event data and is not immediately searchable. To determine a number of searchable copies of each bucket to store in the cluster, a data replication policy may further be configured with a "search factor." A search factor is similar to a replication factor except that it indicates a number of searchable copies of each bucket to store in the cluster. For example, a cluster may be configured with a search factor of one (1), indicating that only one of the copies of a bucket is to include a key word index. However, if a search factor of greater than one is configured, some or all of the indexers storing a replicated copy of a bucket also may generate index files for the buckets they are replicating, or the indexers may receive a copy of the index files from another indexer.

A cluster may be configured with a different replication factor and search factor. For example, a particular cluster may be configured with a replication factor of three (3) and a search factor of two (2). Based on this example data replication policy, the cluster maintains three copies of each bucket in the cluster; however, only two of the copies of each bucket contain index files and are therefore capable of responding to search requests. The indexers storing the third copy of each bucket that does not include the index files may not be able to respond to search requests, but the bucket can be made searchable at a later time by causing the indexer storing the bucket to generate the appropriate index files or to receive the index files from another indexer. For example, a non-searchable copy of a bucket may be made searchable due to one or more indexers storing a searchable copy of the bucket experiencing a failure.

As indicated above, a cluster configured with a data replication policy causes replicated copies to be stored of each bucket created by an indexer of the cluster. When a search query is received by a search head associated with the cluster, the search head may distribute the search query to all of the indexers of a cluster. However, if multiple indexers in the cluster store copies of one or more buckets that contain data that partially satisfies the search query, duplicate search results may be returned to the search head. To ensure that only one indexer of a cluster returns results from each bucket when multiple copies of the buckets exist in the cluster, one indexer is designated as the "primary" indexer for each bucket while other indexers storing copies of the same bucket are designated as "secondary" indexers. An indexer that is designated as the primary indexer for a bucket has primary responsibility for returning results from that bucket that are responsive to search queries received by the primary indexer, while secondary indexers do not respond to search queries with results from secondary copies of the same bucket. In other words, when an indexer of a cluster receives a search query from a search head, the indexer finds events in buckets for which the indexer is the primary indexer and that satisfy the search query criteria. In an alternative embodiment, the other indexers storing copies of the same bucket are simply not designated as the primary indexer for the bucket.

For each bucket that is replicated across multiple indexers of a cluster, the designation of one indexer as the primary indexer and other indexers as secondary indexers may change over time. In one embodiment, a mapping of cluster indexers as either the primary indexer or a secondary indexer for each bucket may be represented using the concept of a "generation." In general, a generation represents a "snapshot" of the cluster at a particular point in time and identifies which indexers are primary and which indexers are secondary for each bucket and replicated copy of a bucket stored in the cluster. A centralized "master node" of the cluster may be responsible for creating a generation mapping and distributing the generation mapping to other components of the cluster. A master node may create multiple different generations with different mappings over time as conditions within the cluster change. Each generation may be identified by a unique generation identifier represented, for example, by a monotonically increasing counter or other set of unique values. For example, a first generation may be represented by a generation identifier of zero (generation 0), a second generation represented by a generation identifier of one (generation 1), and so forth. Thus, for a first generation 0, a particular indexer X of a cluster may be designated as the primary indexer for a particular bucket Z that is replicated across a number of indexers in the cluster. At a later time, a new generation 1 may be created and a different indexer Y instead may be designated as the primary indexer for the same bucket Z. A master node may create new generations and corresponding generation identifiers in response to a number of different cluster events including, but not limited to, any of: the master node initializing, a new indexer joining the cluster, a current indexer failing or leaving the cluster, to rebalance the buckets of a cluster, etc.

Figure 8:
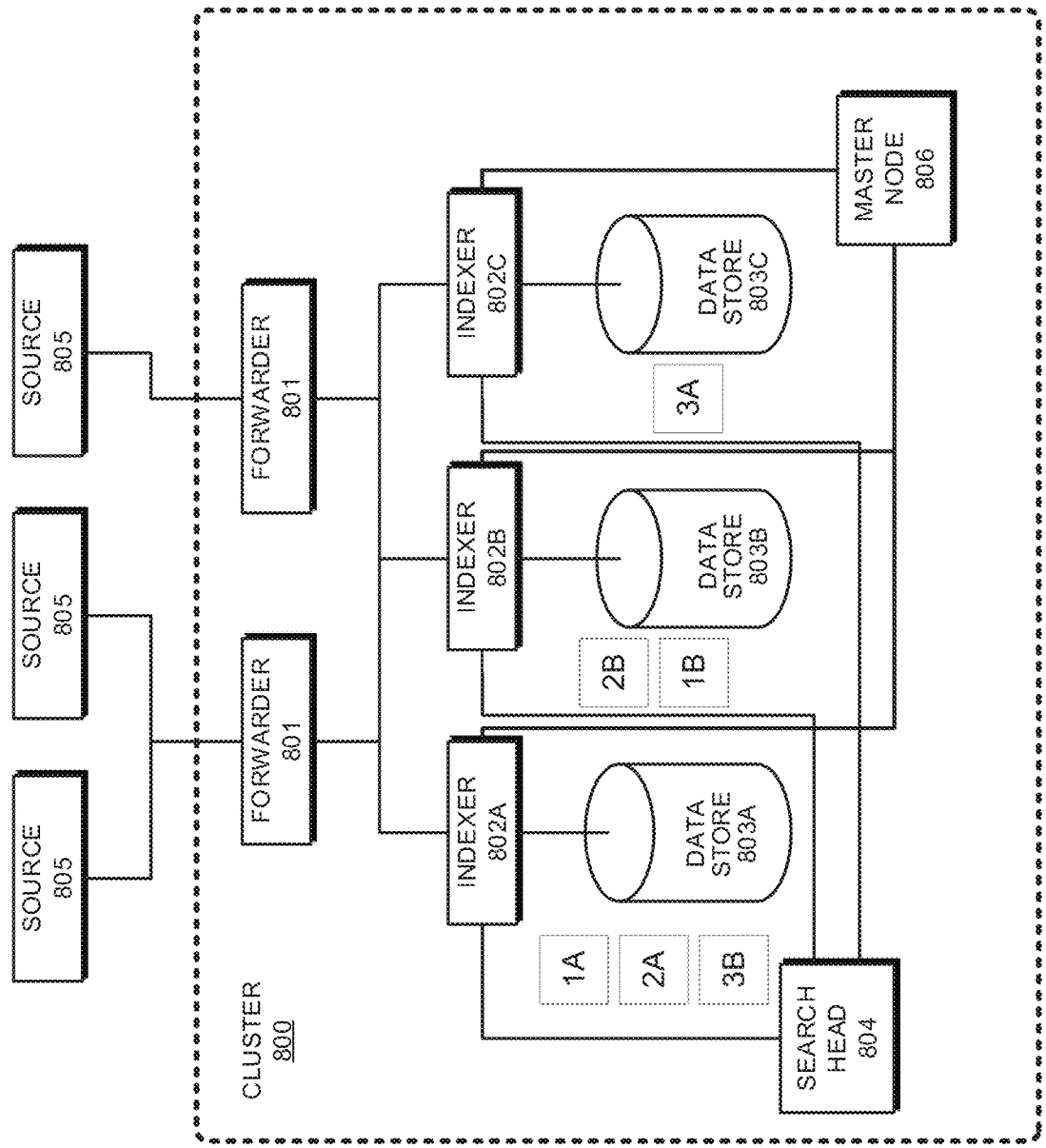
FIG. 8 presents a block diagram of an event-processing system in accordance with the disclosed implementations.

FIG. 8 shows a block diagram of an example embodiment of a clustered data intake and query system, according to one embodiment. Similar to the system 100 of FIG. 1, cluster 800 includes one or more forwarders 801 that collect data from a variety of different data sources 805 and which determine which indexer or indexers (e.g., one or more of indexers 802A-802C) are to receive the data. An indexer 802A-802C receiving data from a forwarder 801 may perform various operations to process, index, and store the data in a corresponding data store 803A-803C. The data processed by an indexer 802A-802C may be stored in a corresponding data store 803A-803C in one or more grouped subsets, or buckets, that correspond to various time ranges. For example, each of data stores 803A-803C is depicted in FIG. 8 as storing one or more example buckets 1A, 1B, 2A, 2B, 3A, and 3B. In this example, "A" and "B" versions of a bucket represent copies of the same bucket.

In cluster 800, a search head 804 is responsible for distributing search queries received from clients to indexers 802A-802C and consolidating any search results received from the indexers. For example, a search head 804 may distribute a search query to indexers 802A-802C which perform the actual searches against the buckets stored by the indexers in data stores 803A-803C.

To perform a search against data stored by cluster 800, in one embodiment, a search head 804 may first obtain information from master node 806 including a list of active indexers and a generation identifier. As indicated above, a generation identifier identifies a particular generation mapping which indicates, for each bucket in the cluster, which indexer is the primary indexer and which indexers are secondary indexers.

The search head 804 may distribute the search query to all of the active indexers along with the generation identifier. Each indexer receiving the search query may use the generation identifier to identify which generation mapping to consult when searching the buckets stored by the indexer. In other words, based on the generation information corresponding to the received generation identifier, each indexer searches for event results in buckets for which the indexer is the primary indexer and which satisfy the search query criteria. After processing the search query, each indexer may send a response to search head 804 either including event results or indicating that the indexer has zero event results satisfying the search criteria based on the generation information. The response from each indexer may further include metadata information indicating an amount of time that elapsed to process the search and/or other diagnostic information. If a search head 804 does not receive a response from one or more of the indexers to which the search query was distributed, the search head 804 may generate an alert indicating that a response was not received from the indexer(s) and that the search results therefore may be incomplete.

Typically, a search head 804 performs a search query with respect to the most recent generation created by the master node. However, in some cases where one or more queries take an abnormally long time to process, it is possible that indexers of a cluster could be processing a search query based on a generation that is earlier than the current generation. Those same indexers could receive a subsequent search query that is based on the current generation and therefore concurrently process two separate queries based on different generations.

In one embodiment, a master node 806 may be configured to maintain an approximately equal number of buckets on each indexer, and to maintain an approximately equal number of buckets for which each indexer has primary responsibility. Without an even distribution of buckets and primary indexer responsibilities, it may be possible that individual indexers have primary responsibility for more buckets than others and may become overloaded if a sufficiently large number of queries are submitted near in time to one another. A master node 806 may periodically rebalance buckets by determining how many buckets are currently stored by each indexer and which indexers are primary indexers for each bucket, and create a new generation where the number of buckets for which each indexer has primary responsibility is approximately the same.

Figure 9:
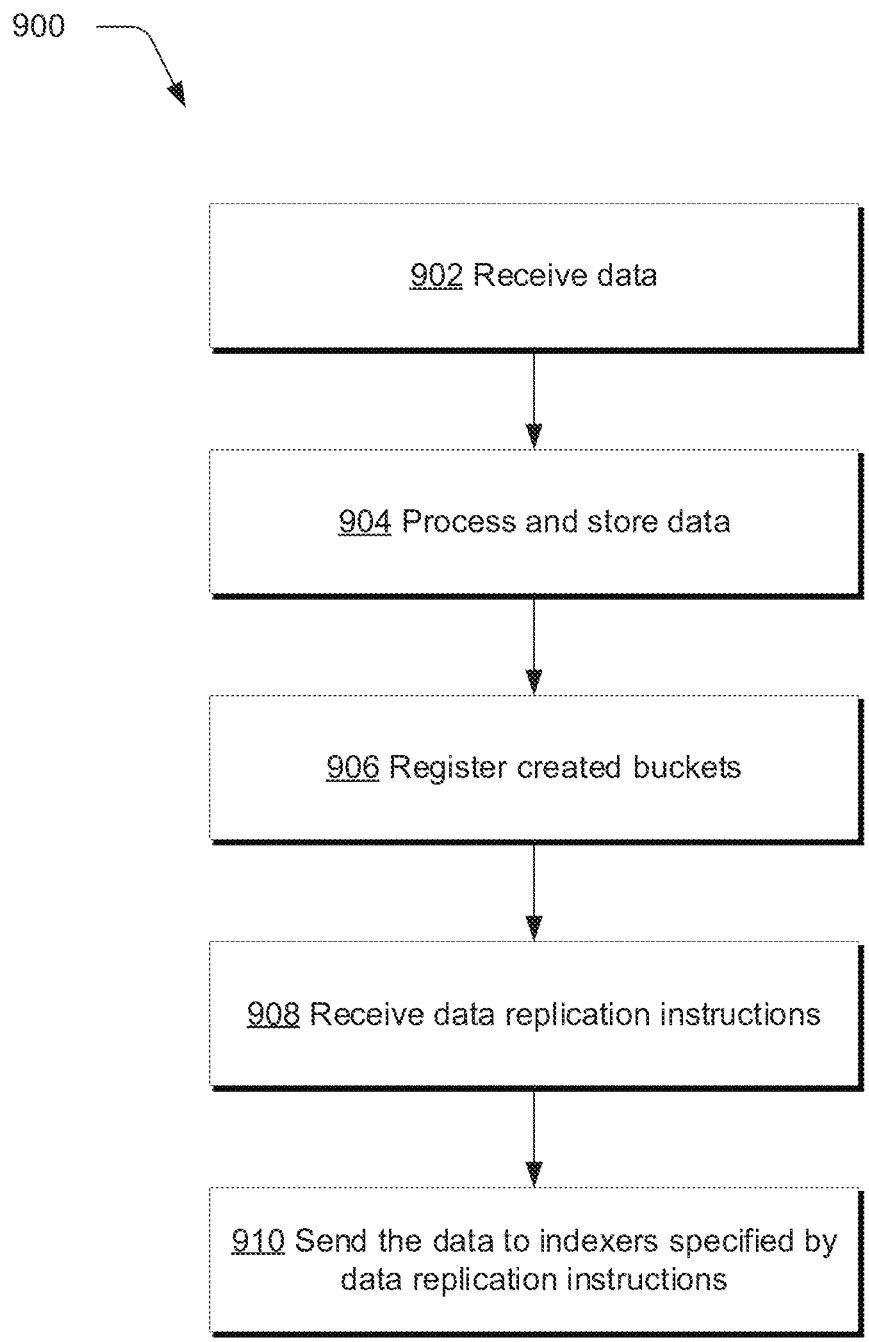
FIG. 9 presents a flowchart illustrating how data can be replicated in accordance with the disclosed implementations.

FIG. 9 illustrates a flowchart of a process 900 that indexers may use to replicate data in a clustered data intake and query system, according to an embodiment. At block 902, an indexer (e.g., one of indexers 802A-802C) receives data from a forwarder 801. At block 904, the indexer processes and stores data in a corresponding data store 803A-803C. Processing the data by an indexer, for example, may include one or more of the steps of segmenting, transforming, and indexing the data, as described above. As indicated above, the data may be stored by the indexer in a data store in one or more grouped subsets, or buckets, of the data received from the forwarder.

At block 906, the indexer registers any newly created buckets with master node 806. Master node 806 may store information about the newly created buckets as part of the current generation information, or the master node 806 may create a new generation that includes information for the newly created buckets. The master node 806 generates, based on a configured data replication policy for the cluster, data replication instructions that include a list of "peer" indexers in the cluster that are to store a replicated copy of the one or more registered buckets. As indicated above, the number of peer indexers that are selected to store a replicated copy of the one or more registered buckets correspond to a replication factor configured for the cluster. The selection of particular peer indexers for storing replicated bucket copies may be further based in part on load balancing criteria or other factors determined by the master node 806. The data replication instructions may also include, for each of the selected peer indexers, whether the peer indexer is to store a searchable or non-searchable copy of each bucket. The master node 806 sends the data replication instructions to the indexer registering the buckets.

In block 908, the indexer receives the data replication instructions including the list of peer indexers to store replicated copies of the buckets created by the indexer. In block 910, the indexer forwards the data to the peer indexers, each of which stores the data in a corresponding data store and, if the peer indexer is storing a searchable copy, processes the data to generate a separate key word index. The data forwarded to the peer indexers may include the raw data received from the forwarder, the event data as processed by the indexer, or any combination thereof.

Referring again to FIG. 8, to illustrate one example of a cluster with data stored according to a data replication policy, each of data stores 803A-803C is depicted storing one or more of the buckets labeled 1A, 2A, 1B, 2B, 3A, and 3B. The example cluster 800, for example, may be configured with a replication factor of two (2). As indicated above, an "A" version of a bucket represents an original version of the bucket, whereas a "B" version represents a replicated copy of the same data bucket. For example, indexer 802A may have received data from a forwarder 801 which indexer 803A processed and stored in the bucket labeled 1A. After registering the bucket 1A with master node 806 and based on received data replication instructions, indexer 802A forwarded the data for bucket 1A to indexer 802B which stored a copy of the data in the bucket labeled 1B. Similarly, indexer 802C may have received data from a forwarder 801 and stored the data in the bucket labeled 3A. Based on replication instructions received from master node 806, indexer 802C forwarded the data for bucket 3A to indexer 802A which stored a copy of the data in the bucket labeled 3B.

Because the example data replication policy for cluster 800 is configured with a replication factor of two (2), as illustrated above, two copies of each bucket are stored by separate components of the cluster. In this manner, if any one of indexers 802A-802B were to experience a failure, at least one copy of each bucket in the cluster still exists somewhere in the cluster. In response to such a failure, master node 806 may create a new generation that, if necessary, reorganizes the designation of particular indexers in cluster 800 as the primary indexer for each bucket so that a searchable copy of each bucket is available without disruption. Techniques for managing data in a cluster environment are described in U.S.

patent application Ser. No. 13/648,116, filed on Oct. 9, 2012, U.S. patent application Ser. No. 13/662,358, filed on Oct. 26, 2012, and U.S. Provisional Patent Application No. 61/647,245, filed on May 15, 2012, each of which is hereby incorporated by reference in their entirety for all purposes.

3.0 Multi-Site Clusters

As indicated above, a cluster may be configured to replicate data in the cluster across multiple indexers of the cluster to improve the availability of the data and to provide for disaster recovery of data in the cluster. However, if all of the indexers of a cluster are geographically collocated at the same site (e.g., within a single data center or office building), the benefits of data replication may be negated upon the occurrence of a failure that affects the entire site. For example, a site-wide failure caused by a major power outage, natural disaster, or a man-made disaster may be capable of entirely disrupting the operation of a cluster if all of the cluster components are located at the same site.

In one embodiment, to further improve the fault tolerance and disaster recovery abilities of a clustered data intake and query system, a cluster may be configured to ensure that replication of data occurs across indexers located at multiple geographically dispersed sites. A cluster that includes the concept of "sites" as part of its data replication policy is referred to herein as a multi-site cluster. A site may refer to a logical grouping of one or more cluster components that may each be associated with a particular geographic location. For example, if a business has two data centers on the east coast and west coast, respectively, a user may define a separate site for each of the data centers and associate particular cluster components with each site depending on where each of the cluster components is located physically.

In one embodiment, in addition to a user configurable replication factor, a data replication policy for a multi-site cluster may further include configuration of a site replication factor. Whereas a replication factor indicates a number of times that each bucket created in a cluster is to be replicated within the cluster, a site replication factor indicates, for each bucket, a number of different sites at which to store a copy of the bucket. For example, a cluster may be configured with five (5) separate sites, a replication factor of four (4), and a site replication factor of three (3). In this example, for each bucket created by an indexer of the cluster, three additional copies of the bucket are to be stored in the cluster, and the four total copies of the bucket are to be stored across at least three different sites of the five sites. In this manner, by configuring a site replication factor of at least two (2) for a multi-site cluster, the cluster may be able to withstand a failure of one or more entire sites.

Figure 10:
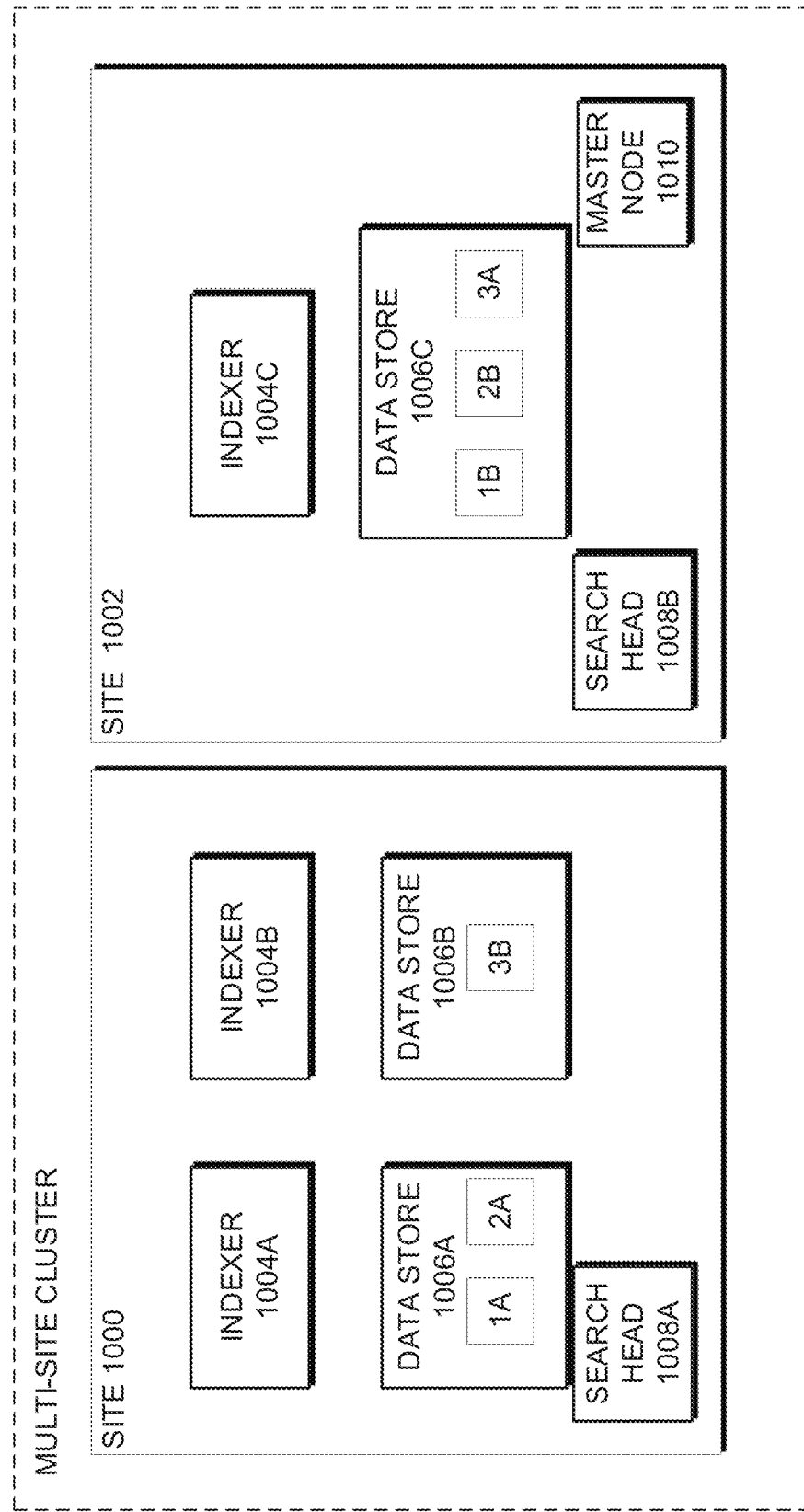
FIG. 10 presents a block diagram of a multi-cluster event-processing system in accordance with the disclosed implementations.

FIG. 10 illustrates an example of a multi-site cluster that includes two defined sites: a site 1000 and a site 1002. As indicated above, each of the sites 1000 and 1002 may represent an individual data center, office building, or other location that houses one or more components of the multi-site cluster. Each of indexers 1004A-1004B, data stores 1006A, 1006B and a search head 1008A is associated with site 1000. Each of indexer 1004C, data store 1006C, master node 1010 and search head 1008B is associated with site 1002. Two sites are illustrated in FIG. 10 for the purposes of illustrating a clear example; however, a multi-site cluster generally may include any number of sites, and any number of cluster components associated with each site, depending on a particular implementation and a particular user configuration. Although not depicted, each of the indexers 1004A-1004C, data stores 1006A-1006C, master node 1010, and search heads 1008A-1008B may be connected via one or more networks. The networks connected to the cluster components may be implemented by any medium or mechanism that provides for the exchange of data between components of the system. Examples of networks that may connect the components of multi-site cluster include, without limitation, a network such as a Local Area Network (LAN), Wide Area Network (WAN), wireless network, the Internet, Intranet, Extranet, etc. Any number of components within the multi-site cluster may be directly connected to each other through wired or wireless communication segments.

Figure 11:
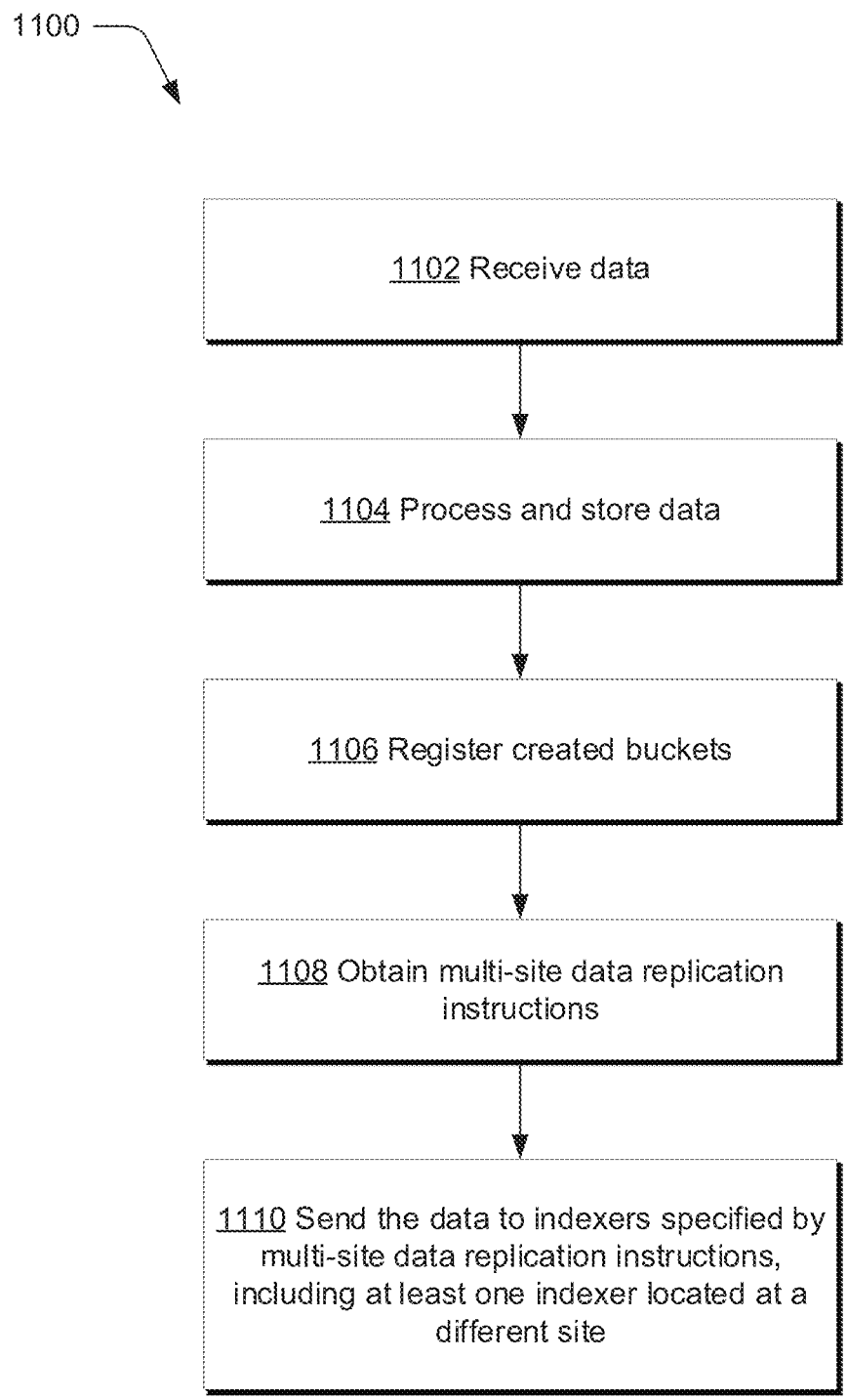
FIG. 11 presents a flowchart illustrating how data can be replicated in accordance with the disclosed implementations.

FIG. 11 illustrates a flowchart of a process 1100 that indexers may use to replicate data in a multi-site clustered data intake and query system, according to embodiments. In block 1102, an indexer (e.g., one of indexers 1004A-1004C) receives data from a forwarder. At block 1104, the indexer processes and stores the data in a corresponding data store 1006A-1006C. For example, the indexer processing and storing the data may include one or more steps of segmenting, transforming, and indexing the data, as described above.

Figure 12A:
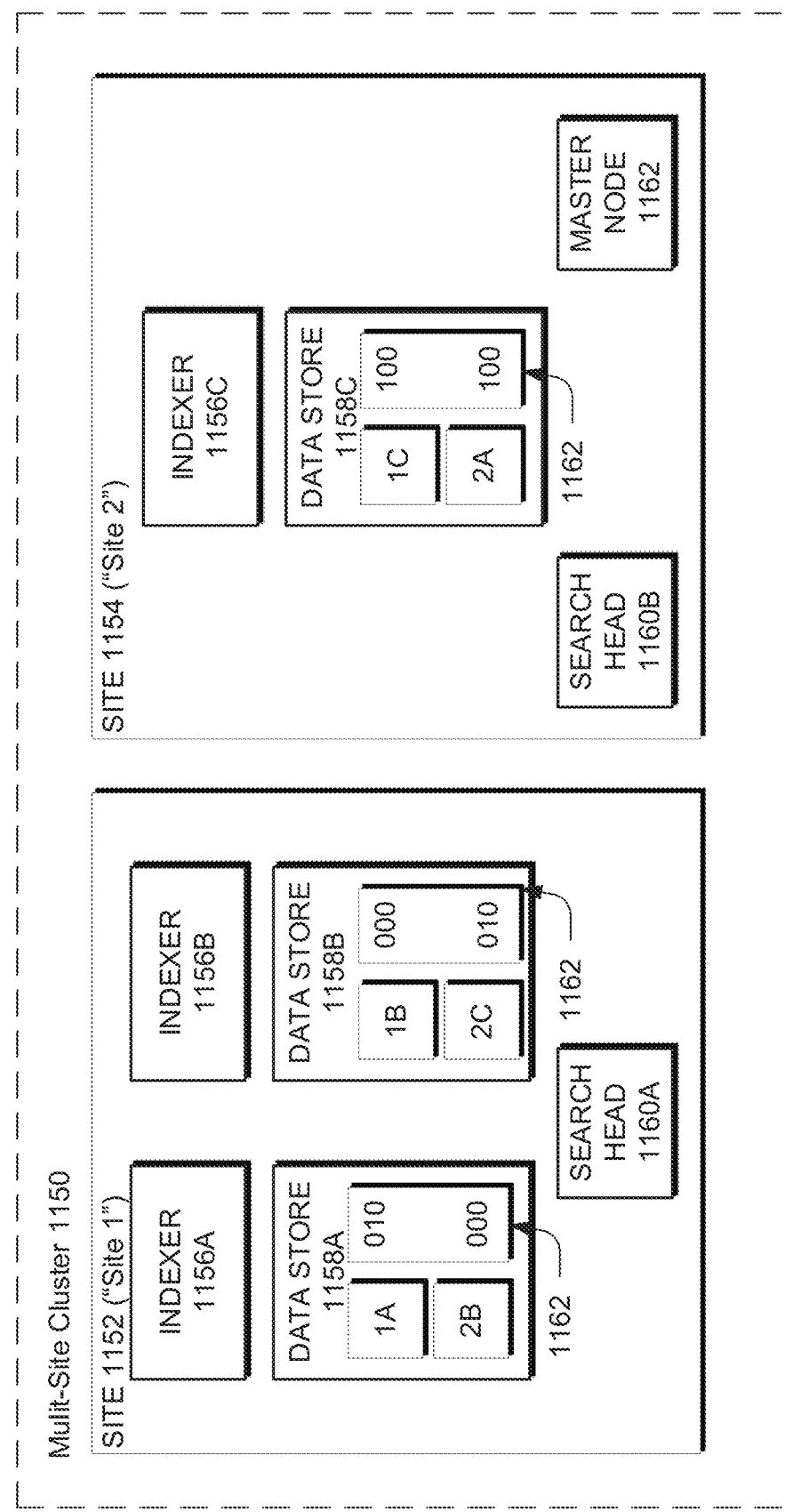
FIG. 12A presents a block diagram of a multi-cluster event-processing system in accordance with the disclosed implementations.

At block 1106, the indexer registers any newly created buckets with master node 1010. As depicted in FIG. 12A, in a multi-site cluster, master node 1010 may be located at the same site as an indexer, or may be located at a different site. However, in one embodiment, a multi-site cluster includes only one master node 1010. Based on multi-site data replication policy information, master node 1010 determines one or more "peer" indexers within the cluster to store replicated copies of the newly created buckets registered by the indexer. As indicated above, the selected peer indexers may include one or more indexers that are associated with sites that are different from the indexer registering the newly created buckets, depending on a configured site replication factor. The indexer may also receive instructions (e.g., generation information, etc.) indicating whether the indexer has primary responsibility for searching each bucket stored by the indexer.

At block 1108, the indexer obtains multi-site data replication instructions from master node 1010. At block 1110, the indexer sends the data to the peer indexers selected by the master node including at least peer one indexer located at a different site, assuming that a site replication factor of at least two (2) is configured.

To illustrate a particular example of a data replication policy for a multi-sigh cluster, in FIG. 10 each of data stores 1006A-1006C is illustrated as storing one or more of the buckets labeled 1A, 2A, 1B, 2B, 3A, and 3B. In the example of FIG. 10, the multi-site cluster may be configured with a multi-state data replication policy that specifies a replication factor of two (2), and is further configured with a site replication factor of two (2). In other words, the example data replication policy configured for the multi-site cluster indicates that each bucket created by an indexer 1006A-1006C is replicated to at least one other indexer, and further, that each bucket is replicated to an indexer that is located at a different site. The "A" and "B" versions of a bucket represent copies of the same bucket.

For example, indexer 1004A may have received data from a forwarder which indexer 1004A processed and stored in bucket 1A. After registering bucket 1A and based on replication instructions received from master node 1010, indexer 1004A forwarded the data for bucket 1A to peer indexer 1004C which stored a copy of the data as bucket 1B. In the example of FIG. 10, because the data replication policy specifies a site replication factor of two (2), indexer 1004B is not available as a replication target for bucket 1A since creating a copy of bucket 1A at indexer 1004B would not result into copies of bucket 1A at two different sites. As another example, indexer 1004C may have received data from a forwarder which indexer 1004C processed and stored in the bucket labeled 3A. After registering the 3A bucket and based on received replication instructions, indexer 1004C forwarded the data for bucket 3A to indexer 1004B which stored a copy of the data in the bucket labeled 3B.

The example illustrated in FIG. 10 is only one particular example of a data replication policy for a multi-sigh cluster and other configurations may be possible. As another example, replicated storage of buckets in a multi-sigh cluster may be configured in an asymmetric fashion where one site is responsible for storing all primary copies of data and another site is configured as a backup data center. In this case, one may configure the policy so that all but one copy lives on the primary site and the remaining copies on the secondary site.

Figure 11A:
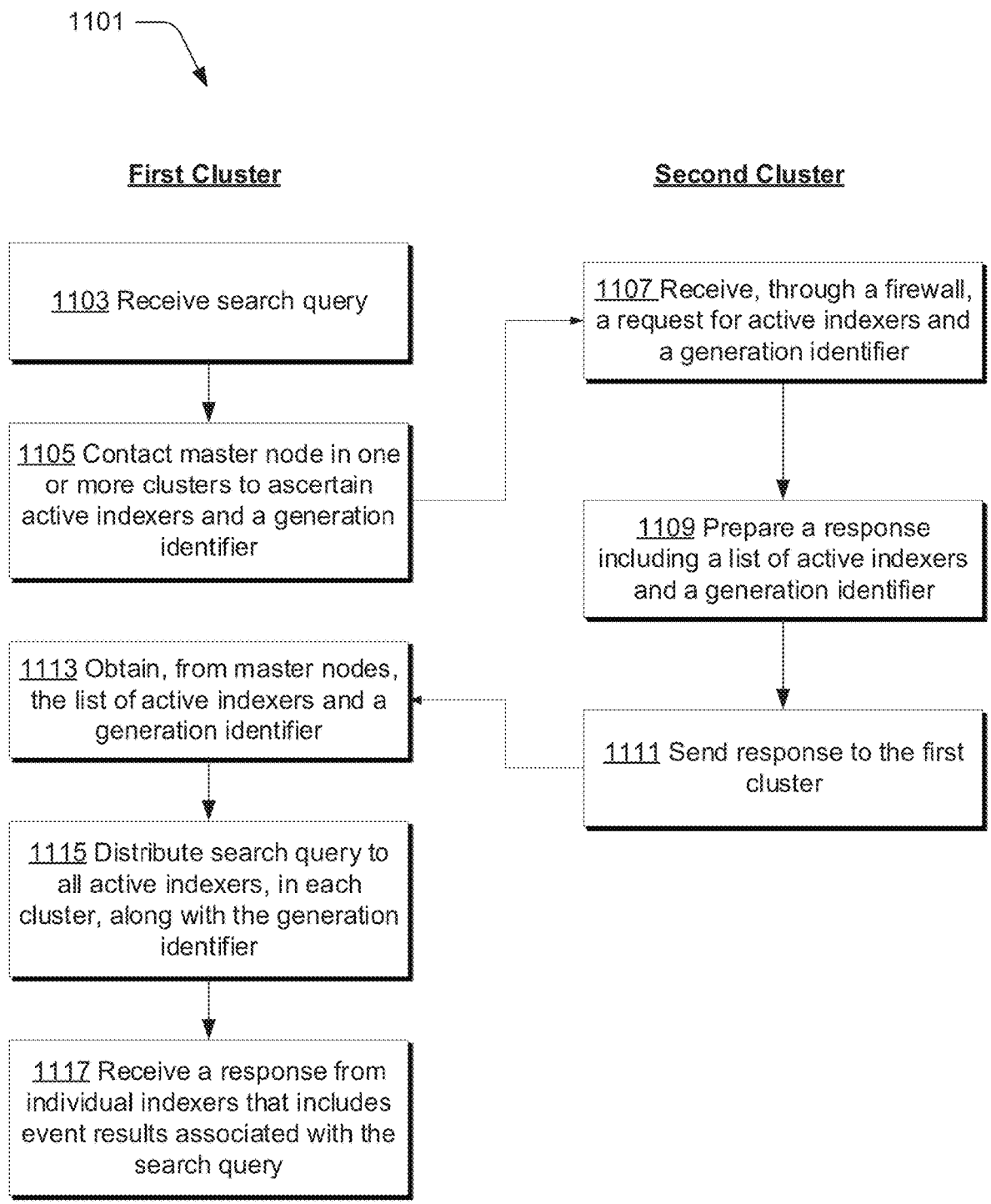
FIG. 11A presents a flowchart illustrating how a search can be performed in accordance with the disclosed implementations.

FIG. 11A illustrates a flowchart of a process 1101 that search heads may use to conduct queries in a multi-site clustered data intake and query system, according to embodiments. The illustrated flowchart includes two columns, one labeled "First Cluster" and the other labeled "Second Cluster." This is to designate which entities perform which operations of the method. In addition, each cluster is also capable of performing acts that are illustrated to be performed by the other cluster.

At block 1103, the search head receives a search query. At block 1105, the search head or an entity on behalf of the search head contacts a master node in one or more clusters to ascertain active indexers for conducting a search, and a generation identifier associated with the search. In at least some embodiments, this step can be performed by contacting the master node(s) through a firewall that exists between the search head and the master node(s). Examples of how this can be done are provided below.

At block 1107, a master node in the second cluster receives, through its firewall, a request from the first cluster that requests the cluster's active indexers and a generation identifier associated with the search. At block 1109, the master node prepares a response including a list of active indexers and a generation identifier. At block 1111, the master node sends the response to the first cluster.

At block 1113, the search head obtains, from the master node(s), the list of active indexers and a generation identifier. At block 1115, the search head distributes the search query to all active indexers in the second cluster (as well as any additional clusters that might have active indexers), along with the generation identifier. This enables the active indexers to conduct the search query as appropriate. At block 1117, the search head receives a response from individual indexers that includes event results associated with the search query. The search head can then process the event results as described above.

4.0 Site-Based Search Affinity

As indicated above, a multi-site cluster may be configured to replicate data stored by the cluster across indexers located at multiple geographically dispersed sites to increase the fault tolerance of the cluster against site-wide failures, among other benefits. As discussed earlier, a multi-site cluster may include multiple sites that each logically group one or more components of the cluster. For example, the components of a multi-site cluster may include one or more search heads and which may be located at one or more of the sites. Because data in a multi-site cluster, and primary responsibility by indexers for that data, may be distributed across indexers located at a number of different sites, a search head may distribute search queries and receive results from indexers located at multiple sites. However, the distribution of search queries to indexers located at multiple geographically dispersed sites may introduce undesirable latency into the search process that is not present when a search head is co-located with all of the indexers of a cluster.

To reduce network traffic and latency when performing searches on data that is stored by indexers located at multiple sites, in one embodiment, a multi-site cluster may be configured such that indexers that are co-located with a search head from which a search query originates are more likely to return any search results that satisfy the query. To cause indexers that are collocated with a search head to be more likely to return search results for queries originating from that search head, in one embodiment, each indexer may store "search affinity" information. Search affinity information indicates, for each bucket stored by a particular indexer and for each site from which a query may originate, whether the particular indexer has primary responsibility for returning search results for that bucket for searches originating at search heads within that site. In other words, whether a given indexer has primary responsibility for returning search results for a particular bucket may depend on the site from which the query originated, and the search infinity information may indicate this for the particular bucket for each possible site from which the query may originate. Search affinity information for a multi-site cluster may be created and maintained by a master node for the cluster, similar to generation information, and may change over time as conditions within the cluster change, as described herein.

In one particular embodiment, search affinity information may be represented by a collection of bitmasks, where each bitmask of the collection is associated with an indexer/bucket pair. For each particular indexer/bucket pair, a bitmask may provide an encoded representation indicating zero or more sites of query origination for which the particular indexer has primary responsibility for responding to search queries for that bucket. For example, a search affinity bitmask may be represented as a string of binary digits, where each individual digit in the string indicates to an indexer whether the indexer has primary responsibility for a bucket for searches originating from a particular site.

As one example, a particular multi-site cluster may consist of three (3) separate sites identified by a number: site 1, site 2, and site 3. To indicate for a particular indexer-bucket pair that the indexer has primary responsibility for the bucket for searches originating from site N, a bitmask may be formed with a value of 1 at the $2^N$ position in the binary string. For example, if a master node determines that an indexer X is to have primary responsibility for a bucket Y for searches originating from site 1 (for example, because indexer X is also located at site 1), the master node may generate a bitmask for the indexer X-bucket Y pair with a 1 in the $2^1$ position (0010). Similarly, if indexer X is to have primary responsibility for bucket Y for searches originating from site 2, the master node may generate a bitmask for the indexer X-bucket Y pair with a 1 in the $2^2$ position (0100), and so forth. If a particular indexer-bucket pair is not to have primary responsibility for searches originating from any site, a master node may generate a bitmask of all zeroes (0000) for the particular indexer-bucket pair.

Although the examples above illustrate bitmasks that indicate that an indexer has primary responsibility for a bucket for searches originating from only a single site, a search affinity bitmask may indicate that an indexer has primary responsibility for a particular bucket for searches originating from multiple sites. For example, an indexer X-bucket Y pair may be associated with a bitmask of 0110, indicating that indexer X has primary responsibility for bucket Y for searches originating from either site 1 or site 2. In general, any combination of search affinity bitmasks may be configured depending on the characteristics of a particular cluster and/or a user configuration.

In an embodiment, search affinity information may be created by a master node and distributed to each indexer of a multi-site cluster for storage by the indexers, similar to distribution of bucket generation information for clusters. Also similar to bucket generation information, search affinity information may change over time as conditions within the cluster change and successive iterations of the search affinity information may be identified by generation identifiers. For example, first search affinity information created by a master node may be identified by a label "generation 0", second search affinity information may be identified by a label "generation 1", and so forth. A master node may create new generations of search affinity information and corresponding generation identifiers in response to a number of different cluster events including, but limited to, any of: the master node initializing, a new indexer joining the cluster, a current indexer failing or leaving the cluster, to rebalance the buckets of a cluster, etc. Indexers may store multiple generations of search affinity information.

In an embodiment, when a search head distributes a search query to indexers of a cluster, the search head may also send a site identifier which indicates the site at which the search head is located. The search head may also distribute a generation identifier that identifies particular search affinity information stored by the indexers. In this manner, when an indexer receives a search from a particular search head, the indexer may use the site identifier and the search affinity information identified by the generation identifier to determine, for each bucket stored by the indexer, whether the indexer has primary responsibility for searches originating from the site identified by the site identifier.

FIG. 12A illustrates an example block diagram of a multi-site clustered data intake and query system that is configured to process search requests based on search affinity information, according to an embodiment. In FIG. 12A, a multi-site cluster 1150 includes a site 1152 and a site 1154. Each of sites 1152, 1154 includes one or more of the cluster components including indexers 1156A-1156C, data stores 11158A-1158C, search heads 1160A, 1160B, and a master node 1164.

Each of indexers 1156A-1156C is depicted as storing one or more of the buckets labeled 1A, 1B, 1C, 2A, 2B, and 2C in a corresponding data store 1158A-1158C. Similar to the examples described above, an "A", "B", and "C" version of a bucket represent replicated copies of the same bucket. In the example of FIG. 12A, the multi-site cluster 1150 may be configured with a replication factor of three (3) and a site replication factor of two (2). Thus, for example, three separate copies of each of buckets 1 and 2 exist in the cluster and at least two separate copies of each bucket are stored at two different sites.

In FIG. 12A, each of data stores 1158A-1158C is illustrated as storing search affinity information 1162. The search affinity information 1162 may have been received and stored by each indexer, for example, when the indexers 1156A-1156C registered the created buckets with master node 1162, periodically received from master node 1164, and/or the search affinity information 1162 may be included as part of a search query distributed by search head 1160A. As indicated above, in one embodiment, the search affinity information may include a collection of bitmasks for each indexer-bucket pair where each digit of a bitmask represents whether the indexer has primary responsibility for the bucket for searches originating from a particular site. In FIG. 12A, only those search affinity identifiers relevant to each indexer are illustrated in each of the data stores 1158A-1158C; however, each indexer may receive and store search affinity identifiers for the entire cluster, or only those search affinity identifiers that are associated with buckets stored by the particular indexer.

Figure 12B:
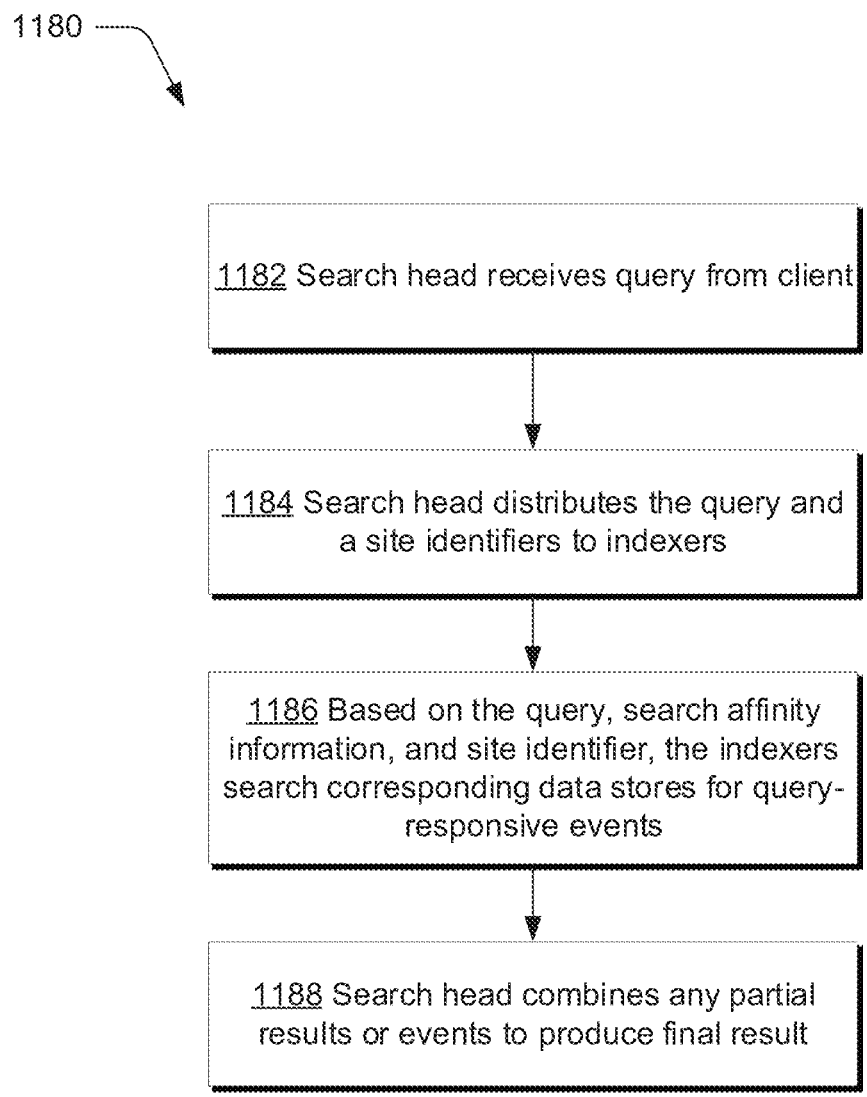
FIG. 12B presents a flowchart illustrating how a search can be performed in accordance with the disclosed implementations.

FIG. 12B is a flowchart 1180 of a process that a search head and indexers of a multisite cluster may perform during a search query according to search affinity information. In block 1182, a search head (e.g., search head 1160A or 1160B) receives a search request from a client. In block 1184, the search head distributes the query and a site identifier to indexers (e.g., indexers 1156A-1156C) of the multi-site cluster. The site identifier indicates the site at which the search head distributing the query is located. The site identifier may be included with the query, or may be sent separately. The search head may also send a generation identifier that identifies particular search affinity information for the indexers to use when processing the query. For example, the indexers may store multiple generations of search affinity information and the generation identifier may identify a particular generation of search affinity information to use for the query.

In block 1186, based on the query, search affinity information, and the site identifier, each of the indexers to which the query was distributed searches a corresponding data store for event results responsive to the query. As indicated above, each indexer may store search affinity information that indicates, for each bucket stored by the indexer, whether the indexer has primary responsibility for the bucket for searches originating from particular sites. The indexers may use the site identifier sent by the search head to determine the originating site of the query for comparison to the search affinity information. For example, if an indexer receives a query and a site identifier indicating that the originating search head is at site 2, the indexer may search buckets that are associated with a bitmask with a 1 in the 22 position (0010).

In block 1188, the search head combines or reduces all of the partial results or events received from the indexers together to determine a final result responsive to the query.

Referring again to FIG. 12A, search head 1160A may distribute a search query to indexers 1156A-1156C and include with the query a site identifier of 1. When indexer 1156A receives the search query from search head 1160A, indexer 1156A may consult search affinity information 1162 to determine whether indexer 1156A stores any buckets associated with a bitmask having a value of 1 in the $2^1$ position (010). For example, indexer 1156A may determine that bucket 1A is associated with a bitmask having a 1 in the $2^1$ position. Thus, in response to the query from search head 1160A, indexer 1156A may return one or more event results from bucket 1A if any of the data in bucket 1A is responsive to the search query. Similarly, because bucket 2B is associated with a bitmask that includes a 0 in the $2^1$ position, indexer 1156A does not return any results from bucket 2B, even if bucket 2B contains event results that are responsive to the query.

5.0 Cloud Based Clusters

In one embodiment, in order to further improve the fault tolerance and disaster recovery abilities of the clustered data intake and query system, cloud-based clusters are utilized. A cloud-based cluster can be thought of as a third-party, managed data intake and query system. The cloud-based cluster can reside in the form of a hosted web service, managed by a third-party, which is accessible through the cloud. So, in a typical deployment, an organization may have an "on-premises" data intake and query system, such as that described above. In addition, the organization may also have or otherwise make use of one or more cloud-based clusters that utilize the principles described above and below. Collectively, the "on-premises" and cloud-based clusters are referred to as a "hybrid" system.

The use of cloud-based clusters carries with it a number of different advantages.

For example, consider the notion of "bursting". That is, an organization may have an on-premises deployment and encounter a situation where an unusually large volume of data is to be processed. The volume of the data may be such that the on-premises deployment may not be able to adequately process the data. In this instance, cloud-based clusters can be utilized to scale out and complement the on-premises deployment in the cloud, without having to incur the cost of adding additional hardware and software infrastructure to the on-premises deployment.

Another advantage concerns data isolation. Specifically, there are particular types of data which, because of the nature of the data or for legal reasons, it is more desirable to maintain the data in on-premises environment. For example, sensitive data such as personal information, Social Security numbers, addresses, financial information, and the like, may be desirable to maintain in the on-premises environment. There may also be data such as sensitive or highly confidential corporate information which is desired to be maintained in the on-premises environment. Yet, there may exist other data, such as various data logs and the like, that does not have stringent requirements for security. This data may be better suited for residing in the cloud. In this instance, it may be advantageous to maintain some data in the on-premises environment, and maintain other data in the cloud cluster.

Further, consider a situation where a corporation has a primary, on-premises deployment. The corporation may have other teams outside of the premises that desire to use the data intake and query system. Rather than having these other teams deploy their own system with perhaps its own licensing model, using a cloud-based cluster to complement the on-premises deployment may be more desirable in terms of utilizing the same operational parameters, e.g., the same licensing model and the like.

In addition, cloud-based clusters can provide desirable economic advantages for organizations that may not necessarily have the financial resources, budget, and time to add the additional hardware infrastructure to support a scaled deployment of its on-premises deployment. So in this instance, the end-user may wish to scale or grow their license, but may not necessarily wish to incur increased costs associated with the hardware infrastructure.

An additional advantage of using cloud-based clusters includes the fact that a large amount of data that can be processed in accordance with the techniques described herein may likely already reside in the cloud. Accordingly, by using cloud-based clusters in concert with on-premises deployments, the expense of retrieving the cloud-based data for use locally is virtually eliminated.

Further, advantages of cloud-based clusters include the fact that many corporations are now moving to cloud-based environments for their data. By having a hybrid solution that utilizes both an on-premises deployment and a cloud-based cluster, these corporations and other users can smoothly transition to a solely cloud-based environment by gradually phasing out their on-premises deployment.

In at least some embodiments, a search head in one cluster, e.g. an "on-premises" cluster, may not necessarily know the topology of the other cluster, e.g. a cloud-based cluster, in terms of conducting a particular search query. In this case, the search head can communicate with the other cluster to request information associated with the other cluster's topology. This information can include information associated with how to communicate with particular indexers. By way of example and not limitation, such information can include the IP addresses of the indexers that are to be used for a particular search query. Once the search head receives information from the other cluster, it can then send out its search query or otherwise cause its search query to be sent to the other cluster from its own cluster.

In at least some embodiments, the search head can communicate with the other cluster through the other cluster's firewall. That is, the other cluster's firewall can be configured with rules that allow the search head to send requests through to the cluster. For example, the other cluster's firewall may be configured with the rule that indicates that a search head having a particular IP address (or communications on behalf of a search head having a particular originating IP address in the event a gateway is used) is allowed to send requests to the cluster asking for information associated with the indexers on which to conduct a particular search query. Examples of how this can be done are provided below.

Figure 13:
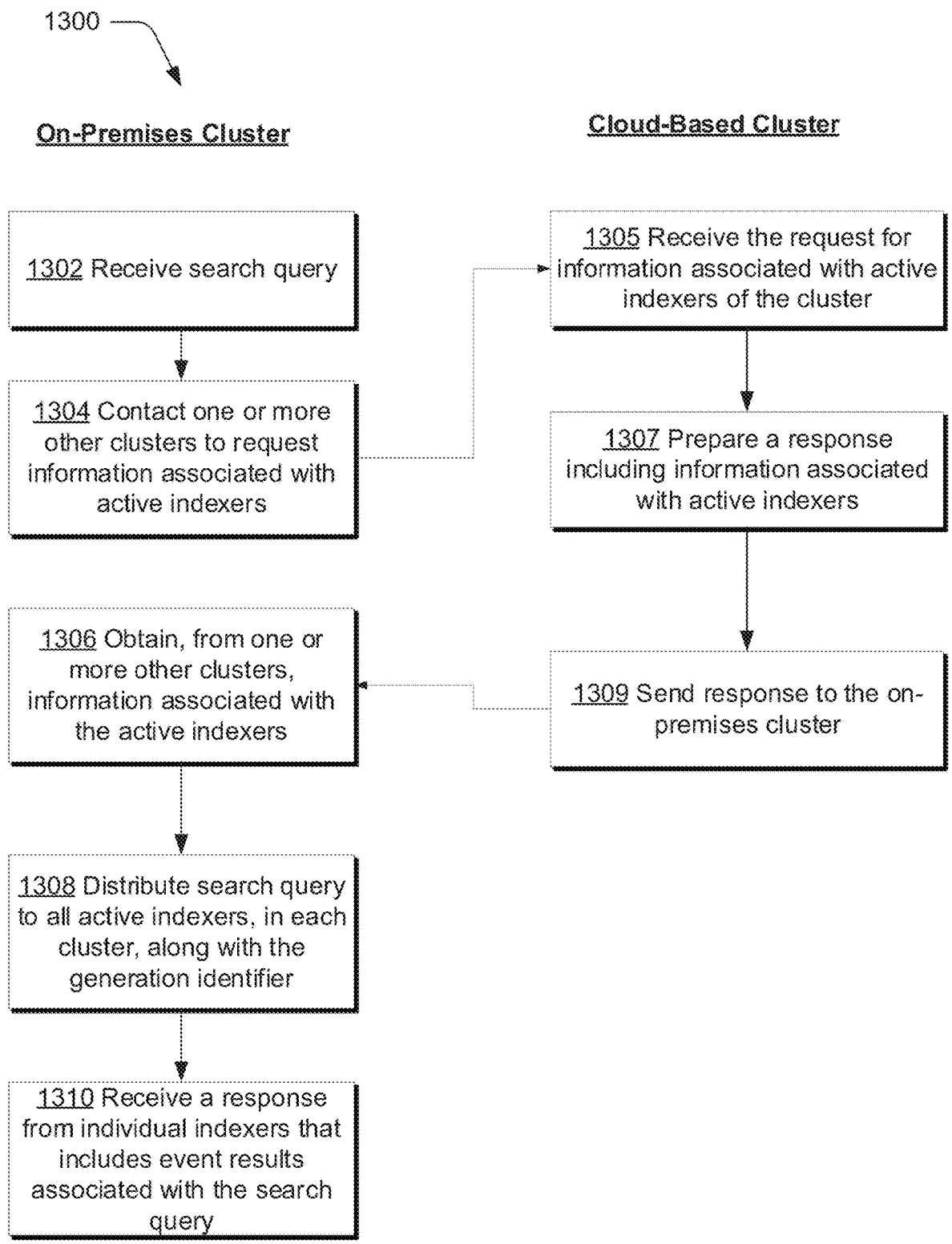
FIG. 13 presents a flowchart illustrating how a search can be performed in accordance with the disclosed implementations.

FIG. 13 illustrates a flowchart of a process 1300 that search heads may use to conduct queries in a multi-site clustered data intake and query system, according to embodiments. The illustrated flowchart includes two columns, one labeled "On-Premises Cluster" and the other labeled "Cloud-Based Cluster." This is to designate which entities perform which operations of the method. In addition, each cluster is also capable of performing acts that are illustrated to be performed by the other cluster.

At block 1302, the search head receives a search query. At block 1304, the search head contacts one or more other clusters to request information associated with active indexers. This communication may or may not occur through firewalls on the other clusters. In at least some embodiments, this can occur through a firewall of the cloud-based cluster.

At block 1305, the cloud-based cluster receives a request for information associated with active indexers of the cluster. At block 1307, the cloud-based cluster prepares a response including information associated with its active indexers. This information will allow the on-premises cluster to communicate with the cloud-based cluster for purposes of conducting a search. At block 1309, the cloud-based cluster sends the response to the on-premises cluster.

At block 1306, the search head obtains, from the cloud-based cluster, the information associated with active indexers of the cloud-based cluster. In at least some embodiments, this information can include a list of active indexers and a generation identifier. At block 1308, the search head distributes the search query to all active indexers, in each cluster, in accordance with the information received from the cloud-based cluster, e.g., the generation identifier. In at least some embodiments, this can occur through the cloud-based cluster's's firewall. At block 1310, the search head receives a response from individual indexers that include event results associated with the search query.

Figure 14:
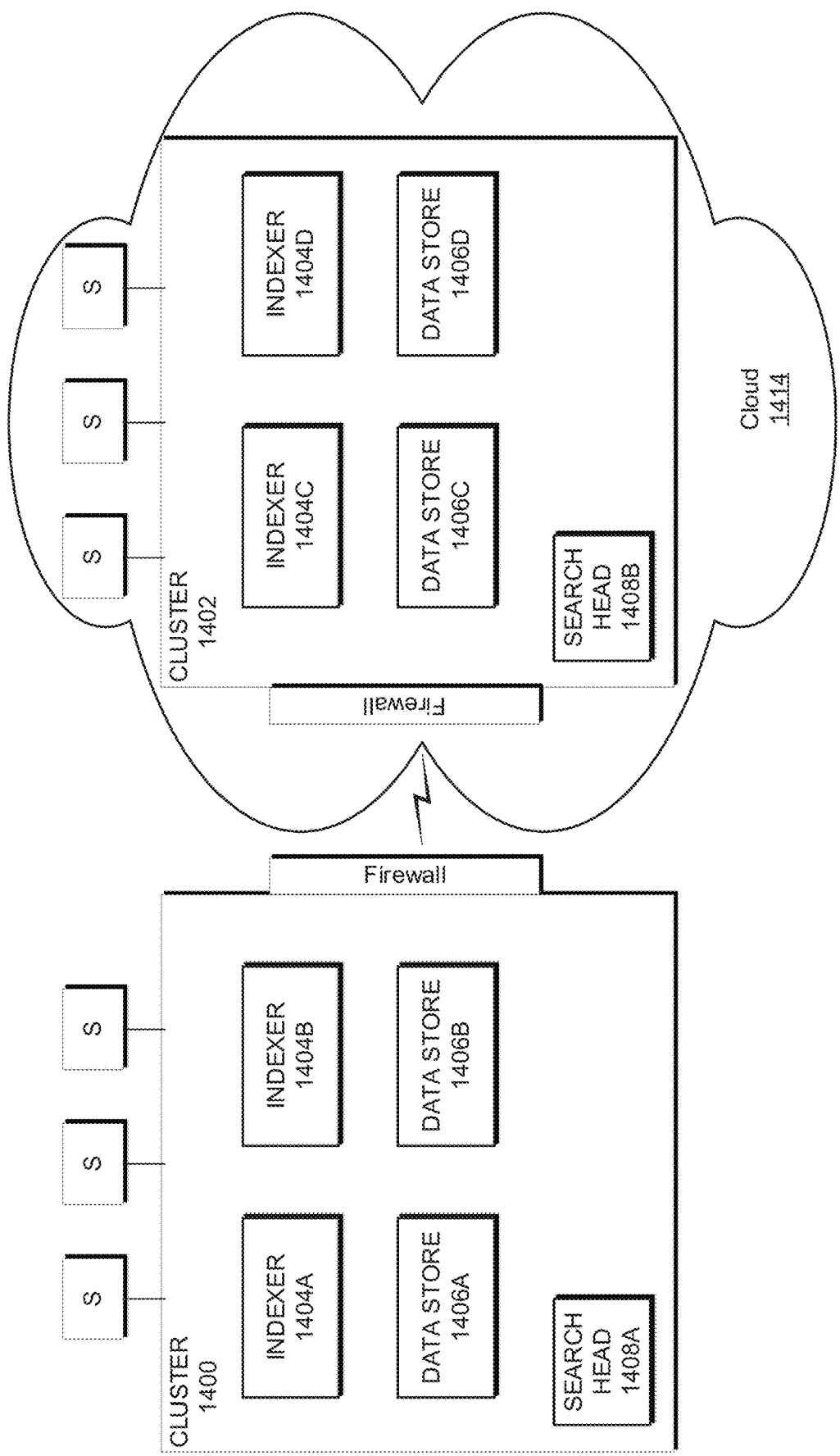
FIG. 14 presents a block diagram of an event-processing system, including a cloud-based cluster, in accordance with the disclosed implementations.

FIG. 14 illustrates an example of a multi-cluster configuration that provides but one example of how the process described just above can be accomplished. The multi-cluster configuration includes two clusters: cluster 1400 and a cloud-based cluster 1402 that resides in the cloud 1414.

Cluster 1400 includes indexers 1404A, 1404B, corresponding data stores 1406A, 1406B, and a search head 1408A. Similarly, cluster 1402 includes indexers 1404C, 1404D, corresponding data stores 14006C, 1406D, and a search head 1408B. Also depicted are data sources designated "S" which provide data to each of the clusters. The illustrated clusters are connected by way of the cloud 1414. In this particular example, each cluster includes a firewall as depicted.

In the illustrated and described example, the firewall at the cloud-based cluster 1402 is configured with a rule set that allows inbound communication from a particular IP address associated with cluster 1400. The particular IP address can be any suitable IP address such as, by way of example and not limitation, the IP address of the search head, an originating IP address that is different from the IP address of the search head, and the like. An originating IP address may be one that is associated with a gateway in the event that cluster 1400 utilizes a gateway to communicate with cluster 1402.

The firewall at cluster 1400 is configured with a rule set that allows outbound communication from the cluster 1400. The rule set can specify that outbound communication is allowed based on an IP address associated with cluster 1400 (such as the IP address of the search head 1408A, an originating IP address, and the like) and the port associated with cluster 1402 with which a connection is desired. The firewall at cluster 1400 can also provide a blocking function that blocks incoming requests until its rule set is modified to allow specific kinds of requests. Thus, the firewall on cluster 1400 can be configured to only allow outgoing requests, and the firewall on cluster 1402 can be configured to allow incoming requests associated with cluster 1400.

Figure 15:
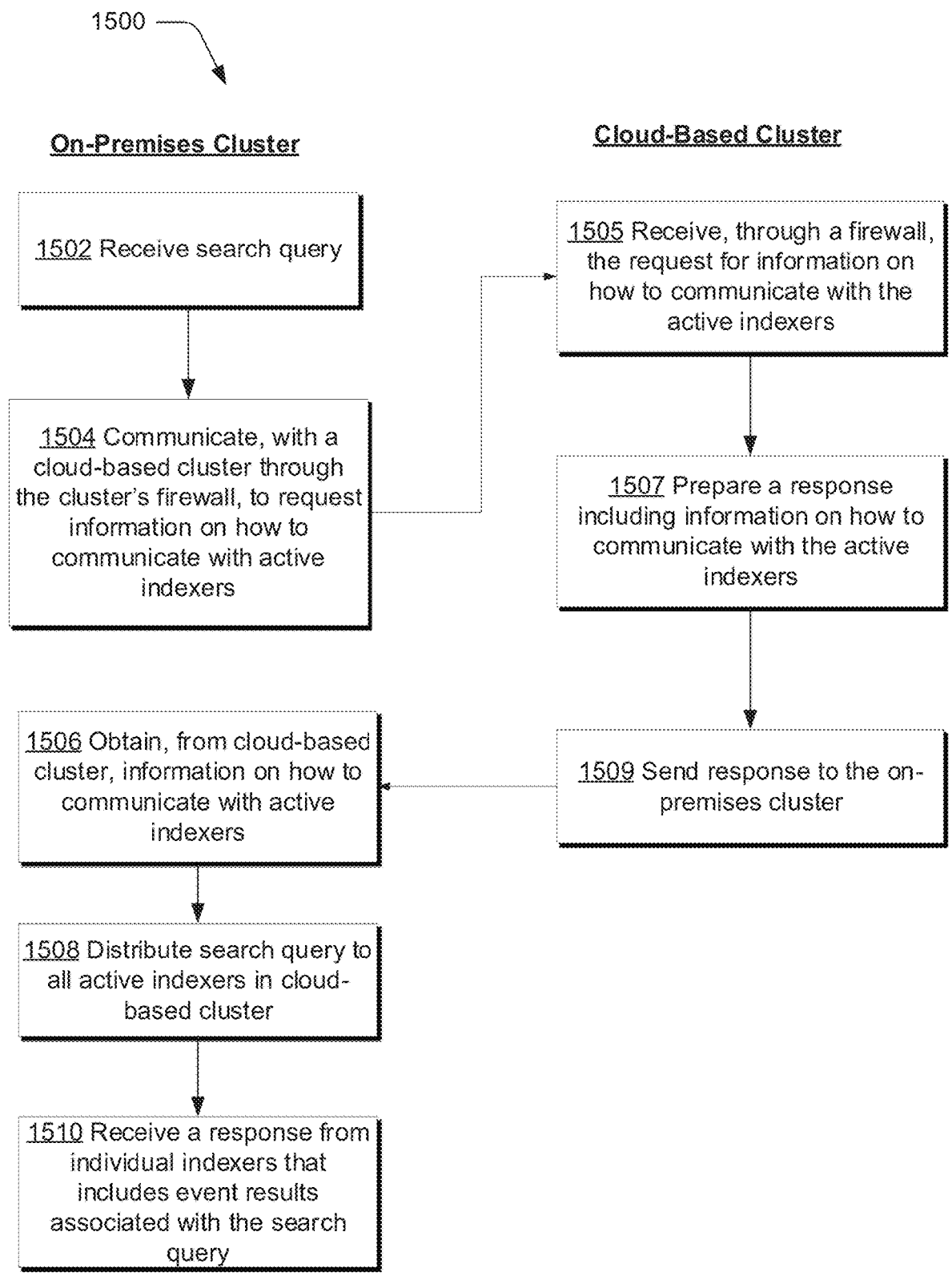
FIG. 15 presents a flowchart illustrating how a search can be performed in accordance with the disclosed implementations.

FIG. 15 illustrates a flowchart of a process 1500 that search heads may use to conduct queries in a cloud-based data intake and query system, according to embodiments. The illustrated flowchart includes two columns, one labeled "On-Premises Cluster" and the other labeled "Cloud-Based Cluster." This is to designate which entities perform which operations of the method. In addition, each cluster is also capable of performing acts that are illustrated to be performed by the other cluster.

At block 1502, the search head receives a search query. At block 1504, the search head or an entity on behalf of the search head communicates, with a cloud-based cluster through the cluster's firewall, to request information on how to communicate with active indexers.

At block 1505, the cloud-based cluster receives, through its firewall, the request for information on how to communicate with the cloud-based cluster's active indexers. At block 1507, the cloud-based cluster prepares a response including the information on how to communicate with the active indexers. At block 1509, the cloud-based cluster sends the response to the on-premises cluster.

At block 1506, the search head at the on-premises cluster obtains, from the cloud-based cluster, the information on how to communicate with the active indexers. In at least some embodiments, this information can include a list of active indexers including the indexers' respective IP addresses, and a generation identifier as described above. At block 1508, the search head distributes the search query to all active indexers, in each cluster, including the cloud-based cluster, in accordance with the information received from the cloud-based cluster, e.g., the generation identifier. This can also include distributing the search query to its own active indexers. This enables the active indexers (at both the on-premises cluster and the cloud-based cluster) to conduct the search query as appropriate. At block 1510, the search head receives a response from individual indexers that includes event results associated with the search query. The search head can then process the event results as described above.

Figure 16:
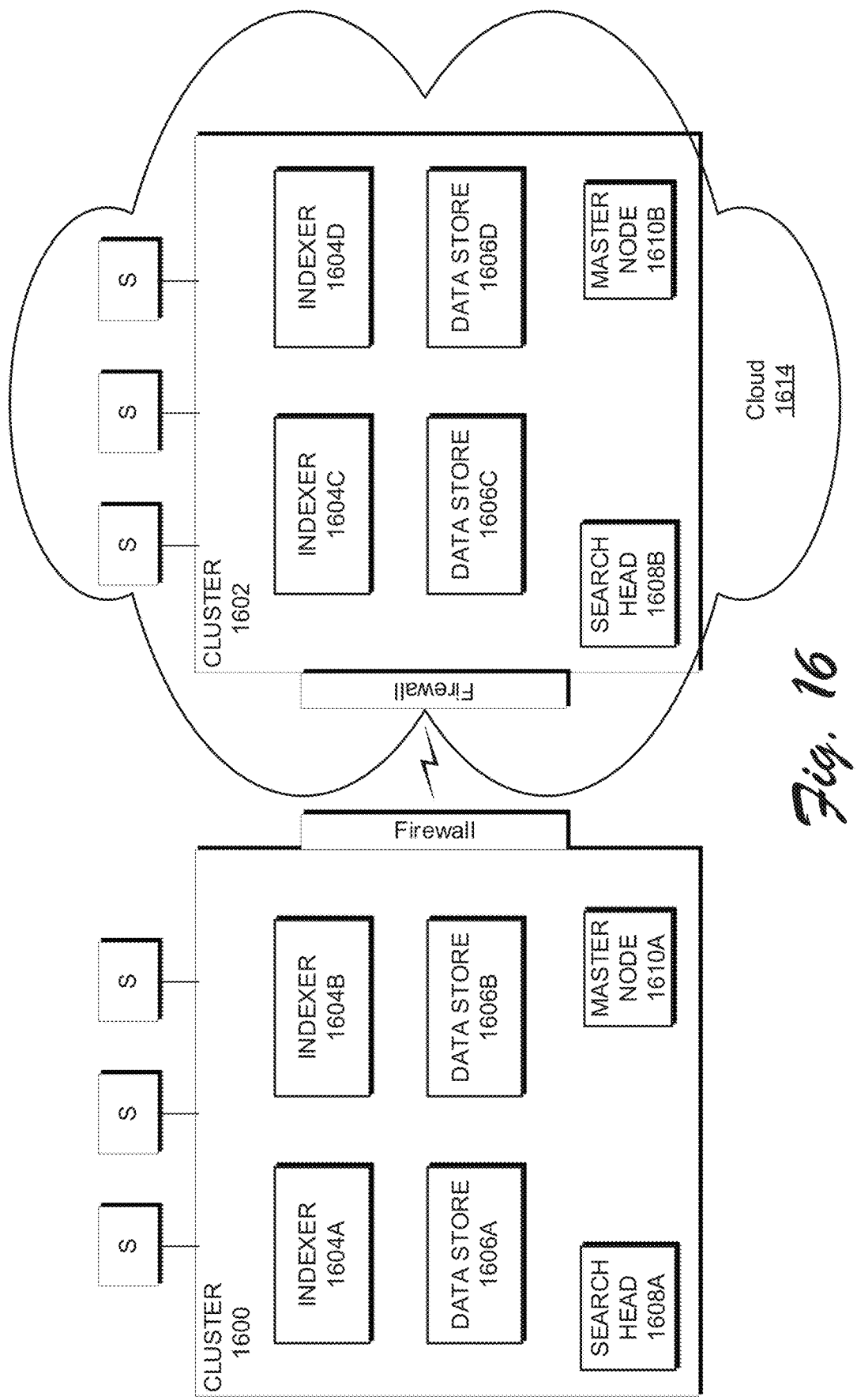
FIG. 16 presents a block diagram of an event-processing system, including a cloud-based cluster, in accordance with the disclosed implementations.

FIG. 16 illustrates an example of a system that includes a cloud-based cluster. Specifically, the system includes an "on-premises" cluster 1600 and a cloud-based cluster 1602. Each cluster can include the components described above. Specifically, cluster 1600 includes indexers 1604A, 1604B, corresponding data stores 1606A, 1606B, a search head 1608A and a master node 1610A. Similarly, cloud-based cluster 1602 includes indexers 1604C, 1604C, corresponding data stores 1606C, 1606C, a search head 1608B and a master node 1610B.

Each of the clusters includes a firewall as illustrated. The firewalls operate as described above with respect to FIG. 14.

Also depicted are data sources designated "S" which provide data to each of the clusters. Although not depicted, each of the indexers, data stores, master nodes, and search heads may be connected via one or more networks. The networks connected to the cluster components may be implemented by any medium or mechanism that provides for the exchange of data between components of the system. Examples of networks that may connect the components of the multi-cluster configuration include, without limitation, a network such as a Local Area Network (LAN), Wide Area Network (WAN), wireless network, the Internet, Intranet, Extranet, etc. Any number of components within the clusters may be directly connected to each other through wired or wireless communication segments.

Figure 17:
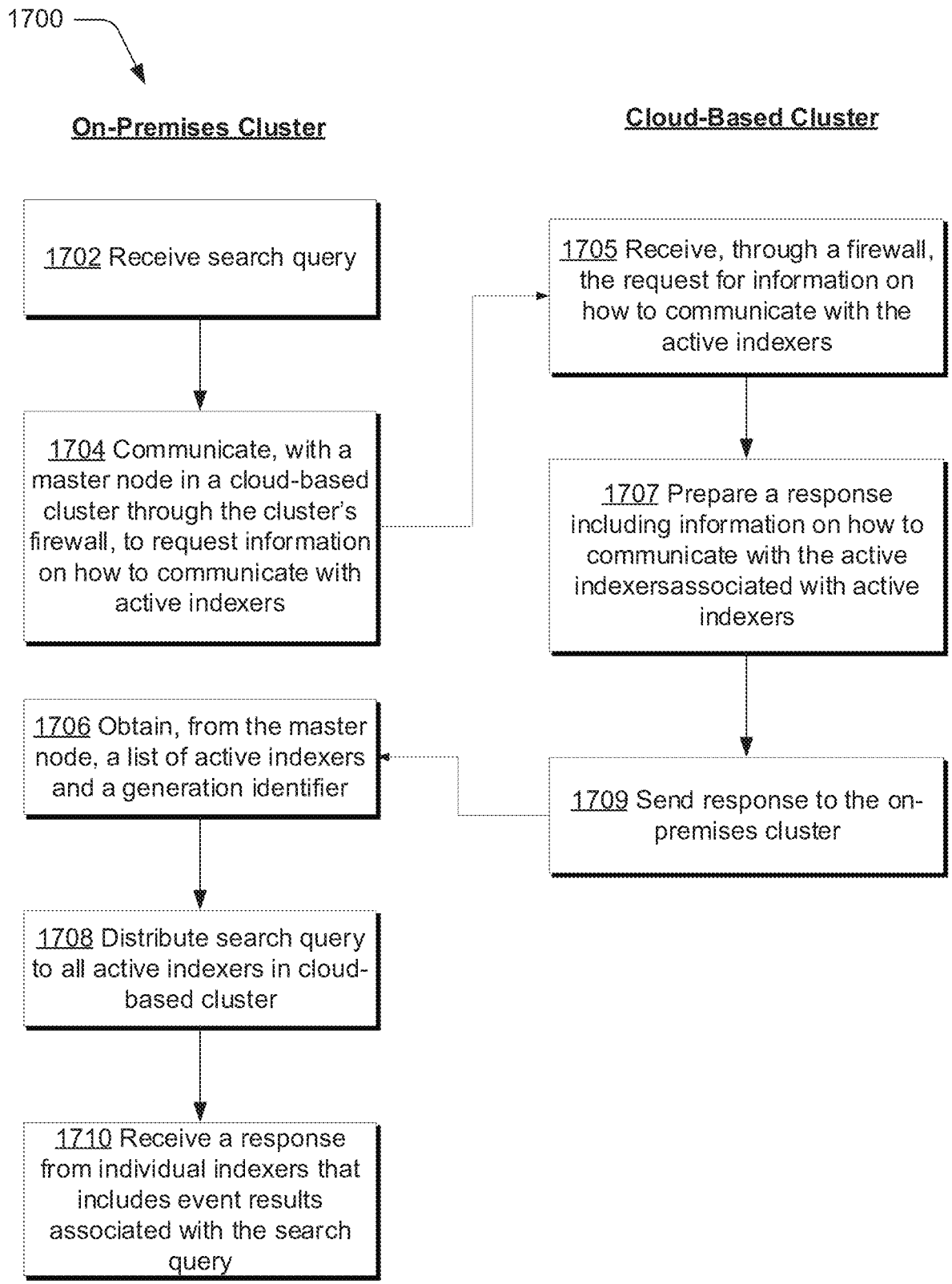
FIG. 17 presents a flowchart illustrating how a search can be performed in accordance with the disclosed implementations.

FIG. 17 illustrates a flowchart of a process 1700 that search heads may use to conduct queries in a cloud-based data intake and query system, according to embodiments. The illustrated flowchart includes two columns, one labeled "On-Premises Cluster" and the other labeled "Cloud-Based Cluster." This is to designate which entities perform which operations of the method. In addition, each cluster is also capable of performing acts that are illustrated to be performed by the other cluster.

At block 1702, the search head receives a search query. At block 1704, the search head or an entity on behalf of the search head communicates, with a master node in a cloud-based cluster through the cluster's firewall, to request information on how to communicate with active indexers.

At block 1705, the master node in the cloud-based cluster receives, through the cluster's firewall, the request for information on how to communicate with the cloud-based cluster's active indexers. At block 1707, the master node prepares a response including the information on how to communicate with the active indexers. At block 1709, the master node of the cloud-based cluster sends the response to the on-premises cluster.

At block 1706, the search head obtains, from the master node, a list of active indexers and a generation identifier. In at least some embodiments, the list of active indexers including the indexers' respective IP addresses. At block 1708, the search head distributes the search query to all active indexers, in each cluster, including the cloud-based cluster, in accordance with the information received from the cloud-based cluster, e.g., the generation identifier. This can also include distributing the search query to its own active indexers as well. This enables the active indexers to conduct the search query as appropriate. At block 1710, the search head receives a response from individual indexers that includes event results associated with the search query. The search head can then process the event results as described above.

Having considered the notion of cloud-based clusters, consider now the notion of configuration information and how configuration information can be shared between various clusters including cloud-based clusters.

6.0 Sharing Configuration Information

Configuration information can be thought of as information that provides additional knowledge that can be utilized during a search. Examples of configuration information can include, by way of example and not limitation, saved searches, event types, transactions, tags, field extractions, field transforms, lookups, workflow actions, search commands, and views.

A saved search is a search the user has made available for later use. In at least some embodiments, searches can be saved as reports, alerts, or dashboard panels. An event type enables categorizing and labeling of all indexed events that match a specified search string. An event type has a name and an associated search. A transaction is a group of conceptually-related events that spans time. Events grouped together by transaction often represent a complex, multistep business-related activity, such as all events related to a single hotel customer reservation session, or a customer session on a retail website. A tag enables efficient searches for events that contain particular field values. One or more tags can be assigned to any field/value combination including event types, hosts, sources, and source types. Tags can enable one to track abstract field value such as IP addresses or ID numbers. For example, one could have a number of field values related to a home-office, including an IP address such as 192.168.1.2. These values could be tagged as "home office" and then search on tag=homeoffice to find all events with field values that have the homeoffice tag. Tags also enable grouping of sets of related field values together. In addition, multiple tags can be given to extract fields that reflect different aspects of their identity. This enables creation of tag-based searches that use Boolean operators to narrow down on specific event sets. A field extraction is a field that has been extracted from the event data. A field transformation contains a field-extracting regular expression and other attributes to govern the way that the transform extracts and formats field/value pairs. A lookup enables the addition of fields and related values to search results based on field matching with a suitable table or script. For example, one can use a lookup to perform DNS or reverse DNS lookups on IP addresses or host names within data. A workflow action enables a variety of interactions between indexed fields in events and other web resources, including external web resources. For example, workflow actions can be defined that are associated with an IP address field in search results. They can be used to perform an external lookup based on a particular value of that field in a specified event. A search command is a command that is utilized to interact with data. Search commands can be used to refine and modify search results. A view constitutes or defines a way in which search results are displayed. These constitute but a few examples of configuration information. Other types of configuration information can be utilized without departing from the spirit and scope of the claimed subject matter.

In the illustrated and described embodiments, particularly in the cloud-based cluster embodiments, configuration information can be shared amongst the clusters. This permits different clusters to benefit from configuration information that might have been developed relative to a different cluster. In the illustrated and described embodiments, configuration information can be shared by using a shared data store. That is, each cluster can communicate its configuration information outside of the cluster to a data store in which the shared configuration information resides. This can include communicating the configuration information through a firewall associated with the cluster and to the shared data store. One reason for communicating the configuration information through the firewall and outside the cluster is for security. Specifically, it is a safer practice to not allow incoming connections to a particular network associated with the cluster. Having an outgoing connection to, for example, the shared data store is much safer because the outgoing connection can be controlled much more easily. As in the illustrated and described embodiment, the shared data store can be implemented as "passive" storage. In this manner, the data from the shared data store is not directly accessed by the search process from the shared location. Rather, a different process, such as one that can be located in each cluster, synchronizes the data from the shared storage to each cluster and back.

Figure 18:
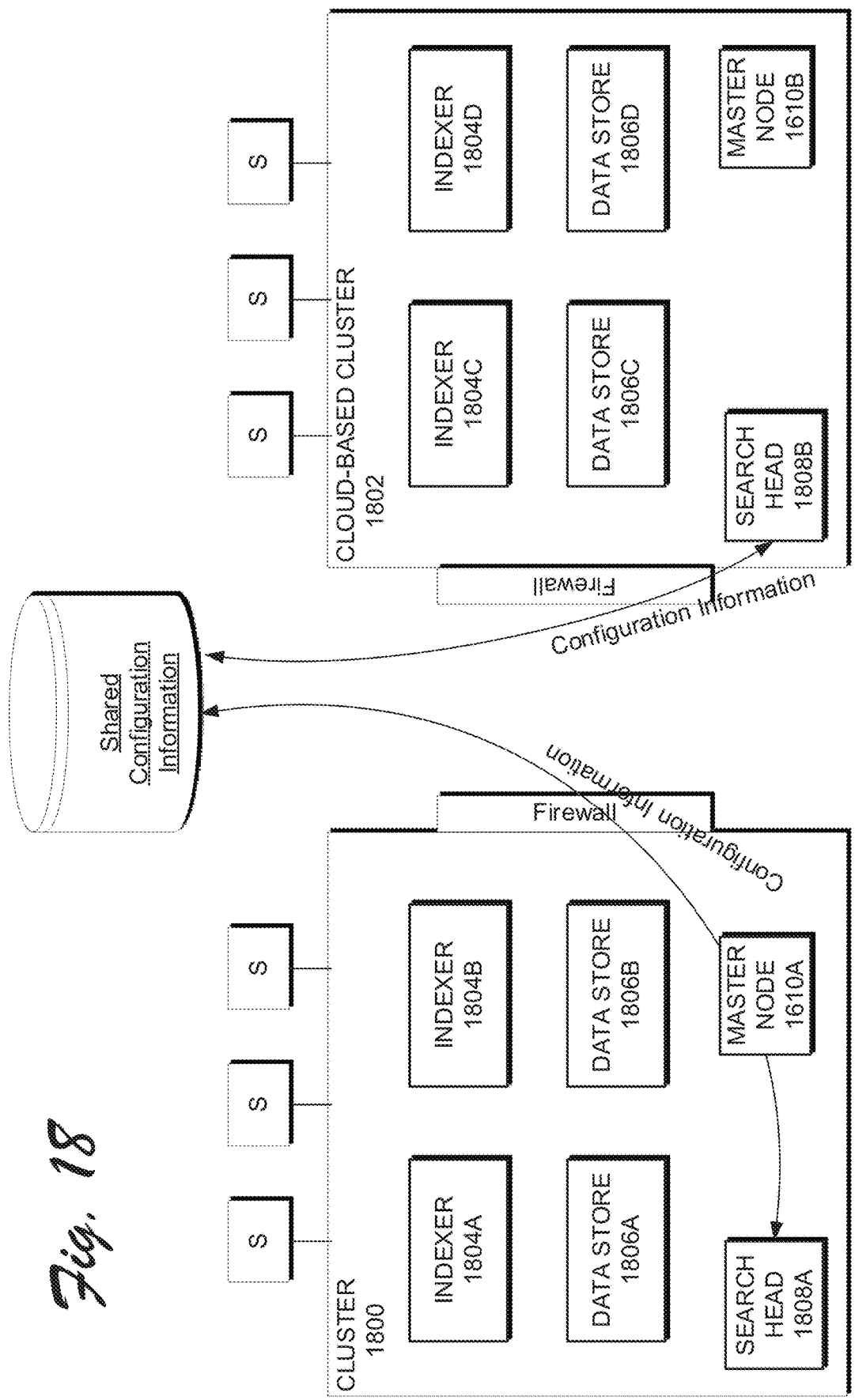
FIG. 18 presents a block diagram of an event-processing system, including a cloud-based cluster in which configuration information can be shared, in accordance with the disclosed implementations.

As an example, consider FIG. 18 which illustrates a system that is substantially the same as described with respect to FIG. 16, except that the "16XX" series designators have been replaced by "18XX" series designators. Since the operation of the FIG. 18 system is substantially the same as the FIG. 16 system, a description of such operation has been omitted for brevity. In addition, because of spacing constraints, the cloud within which cloud-based cluster 1802 would reside has been removed for clarity. It is to be appreciated and understood, however, that the cloud-based cluster 1802 resides within the cloud in the same manner as set forth in FIG. 16 with respect to cluster 1602.

Assume in this example that cluster 1800, an "on-premises" cluster, has developed or otherwise modified some configuration information associated with a particular search. In this particular example, the cluster 1800 and, more accurately, the search head 1808A can cause the configuration information to be communicated through its associated firewall and deposited in the shared data store (designated "Shared Configuration Information"). Now, if the cloud-based cluster 1802 wishes to utilize the configuration information, the cloud-based cluster 1802 and, more accurately, search head 1808B, can retrieve or cause retrieval of the configuration information from that location. In this manner, there is no direct communication between the two clusters with respect to the configuration information. Again, this provides an added degree of security and safety for each cluster.

In at least some embodiments, the configuration information can be configured as "read-only" information. In this manner, one cluster may not modify configuration information provided by another cluster. In at least some other embodiments, the configuration information can be configured as "read and write" information. In this manner, one cluster may modify configuration information provided by another cluster. In instances where configuration information can be modified by another cluster, synchronization techniques can be utilized to resolve any inconsistent changes that might be made by different clusters. This can be done using any suitable type of synchronization technique. For example, one approach can be to ascertain the priority of a particular change and merge higher priority changes into the configuration information. Other approaches can be used including various algorithmic approaches that will be appreciated by the skilled artisan. Other approaches can include utilizing locks in which configuration information is "locked" for purposes of making changes. When configuration information is locked, only the cluster that locked the configuration information can make changes. When the configuration information is unlocked, other clusters can be free to make changes to the configuration information.

The configuration information can be organized and bundled in any suitable way. In at least some embodiments, the configuration information represents a knowledge object. Accordingly, each type of configuration information represents its own associated knowledge object. So, for example, saved searches represent saved search knowledge objects. Likewise, event types represent event type knowledge objects, and so on. Information and data of the knowledge objects can then be provided by a search head to the shared data store as described above.

Figure 19:
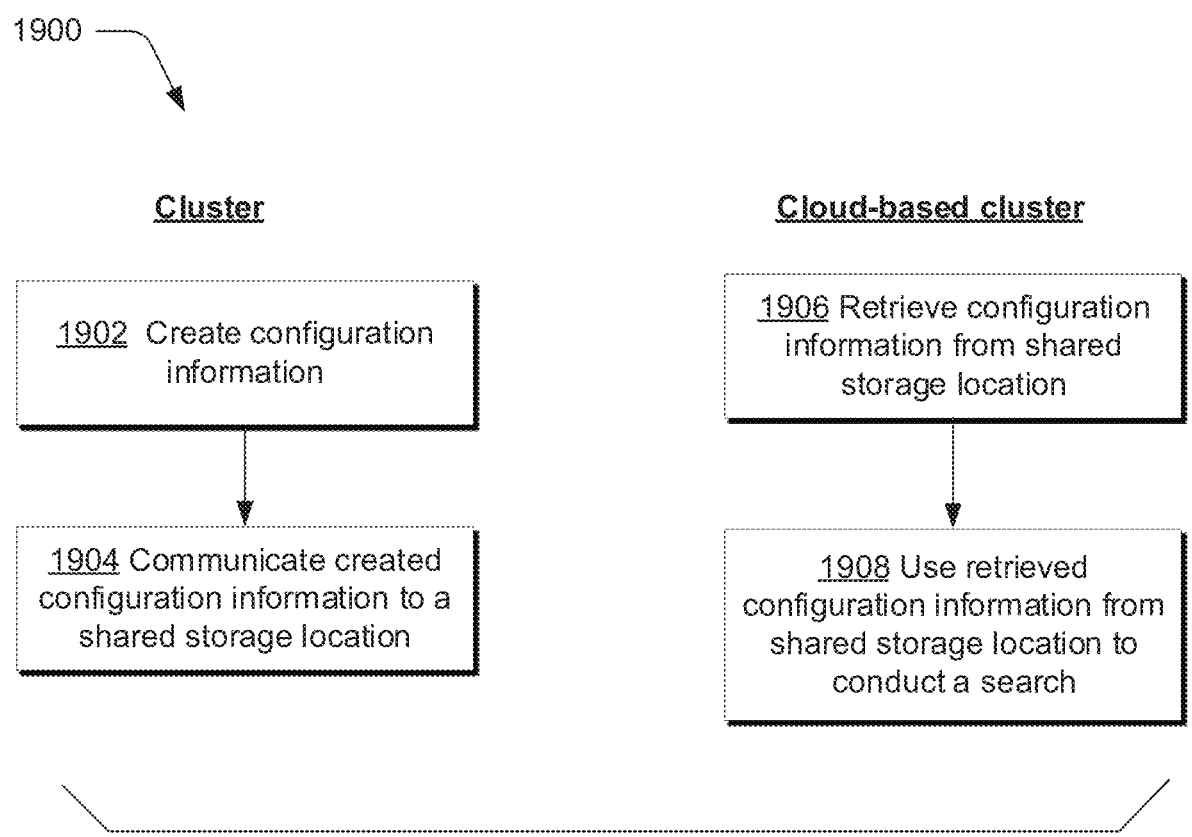
FIG. 19 presents a flowchart illustrating how configuration information can be shared and used in accordance with the disclosed implementations.

FIG. 19 illustrates a flowchart of a process 1900 that can be utilized to share configuration information between clusters in a cloud-based data intake and query system, according to embodiments. The illustrated flowchart includes two columns, one labeled "Cluster" and the other labeled "Cloud-based cluster." This is to designate which entities perform which operations of the method. In addition, each cluster is also capable of performing acts that are illustrated to be performed by the other cluster.

At block 1902, a first cluster creates or accesses configuration information associated with searching data accessible by the first cluster. This can be done in any suitable way utilizing any suitable type of configuration information, examples of which are provided above. In some embodiments, the configuration information includes a lookup table for enriching data retrieved from a search query. In some embodiments, the configuration information includes schema for searching data. In some other embodiments, the configuration information includes extraction rules defining fields of a late binding schema for searching data.

At block 1904, the first cluster communicates the created the configuration information to a shared storage location. The shared storage location is shared between at least the first cluster and the cloud-based cluster for searching different data than the data in the first cluster. This can be done in any suitable way. For example, in at least some embodiments, the first cluster communicates its created configuration information through its firewall to the shared storage location. This communication can be done through on outgoing one-way connection from the first cluster At block 1906, a second cluster, here illustrated as a cloud-based cluster, retrieves or otherwise receives the configuration information from the shared location. This can be done by the cloud-based cluster retrieving the configuration information from the shared storage location through an outgoing one-way connection. In embodiments, the cloud-based cluster can retrieve the configuration information from the shared storage location through a firewall associated with the cloud-based cluster. After the configuration information is retrieved, a validation and sanitization process can take place to ensure that the data does not contain malicious configurations or executables. At block 1908, the cloud-based cluster uses the retrieved configuration information from the shared storage location to conduct a search. The search can be a search of data that is different from data of the first cluster. The data can include any suitable type of data examples of which are provided above. Such data can include, by way of example and not limitation, log data, wire data and the like. Further, as in the above examples, the searches conducted by the first and second clusters can use a late-binding schema as described above. The shared storage can be assessable by other clusters as well.

If the configuration information is "read only", then the method can terminate at block 1908. If, on the other hand, the configuration information is configured as "read and write" and the cloud-based cluster (or whatever cluster retrieved the configuration information) modified the configuration information in some way, the method can include an additional step of communicating or causing communication of the configuration information back to the shared storage location. This can include, in at least some embodiments, communicating the configuration information back to the shared storage location through a firewall associated with a cloud-based cluster.

The process just described eliminates the need for direct communication between the clusters with respect to sharing configuration information. In this manner, only outgoing connections from each cluster are utilized to provide the configuration information to a shared location from which it can be retrieved and used by other clusters, thus promoting network security.

Having considered various embodiments associated with sharing configuration information, consider now an example system and device that can be utilized to implement the described embodiments.

Example System and Device

Figure 20:
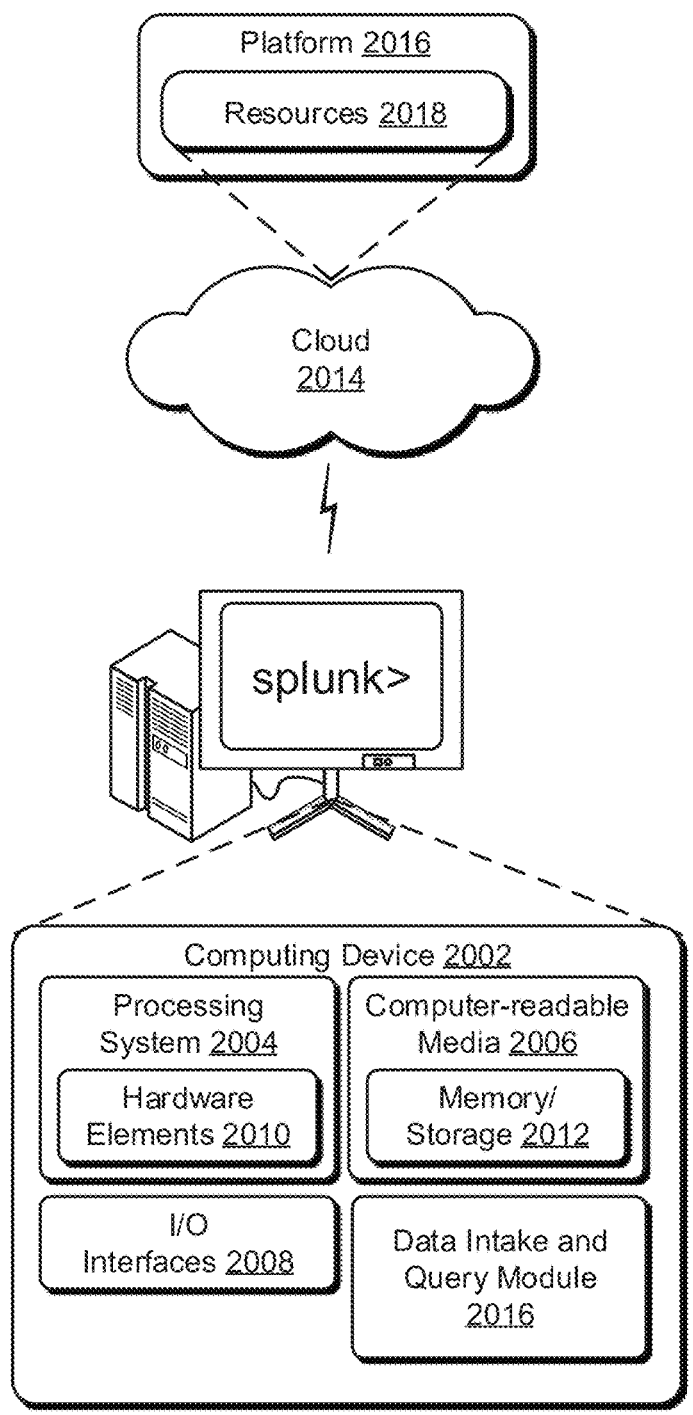
FIG. 20 illustrates an example system including various components of an example device that can be implemented as any type of computing device to implement embodiments of the techniques described herein.

FIG. 20 illustrates an example system generally at 2000 that includes an example computing device 2002 that is representative of one or more computing systems and/or devices that may implement the various techniques described herein. This is illustrated through inclusion of the data intake and query module 2016, which operates as described above. The computing device 2002 may be, for example, a server of a service provider, a device associated with a client (e.g., a client device), an on-chip system, and/or any other suitable computing device or computing system.

The example computing device 2002 as illustrated includes a processing system 2004, one or more computer-readable media 2006, and one or more I/O interface 2008 that are communicatively coupled, one to another. Although not shown, the computing device 2002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2004 is representative of functionality to perform one or more operations using hardware. Accordingly, the processing system 2004 is illustrated as including hardware elements 2010 that may be configured as processors, functional blocks, and so forth. This may include implementation in hardware as an application specific integrated circuit or other logic device formed using one or more semiconductors. The hardware elements 2010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2006 is illustrated as including memory/storage 2012. The memory/storage 2012 represents memory/storage capacity associated with one or more computer-readable media. The memory/storage component 2012 may include volatile media (such as random access memory (RAM)) and/or nonvolatile media (such as read only memory (ROM), Flash memory, optical disks, magnetic disks, and so forth). The memory/storage component 2012 may include fixed media (e.g., RAM, ROM, a fixed hard drive, and so on) as well as removable media (e.g., Flash memory, a removable hard drive, an optical disc, and so forth). The computer-readable media 2006 may be configured in a variety of other ways as further described below.

Input/output interface(s) 2008 are representative of functionality to allow a user to enter commands and information to computing device 2002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2010 and computer-readable media 2006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2010. The computing device 2002 may be configured to implement particular instructions and/or functions corresponding to the software and/or hardware modules. Accordingly, implementation of a module that is executable by the computing device 2002 as software may be achieved at least partially in hardware, e.g., through use of computer-readable storage media and/or hardware elements 2010 of the processing system 2004. The instructions and/or functions may be executable/operable by one or more articles of manufacture (for example, one or more computing devices 2002 and/or processing systems 2004) to implement techniques, modules, and examples described herein.

The techniques described herein may be supported by various configurations of the computing device 2002 and are not limited to the specific examples of the techniques described herein. This functionality may also be implemented all or in part through use of a distributed system, such as over a "cloud" 2014 via a platform 2016 as described below.

The cloud 2014 includes and/or is representative of a platform 2016 for resources 2018. The platform 2016 abstracts underlying functionality of hardware (e.g., servers) and software resources of the cloud 2014. The resources 2018 may include applications and/or data that can be utilized while computer processing is executed on servers that are remote from the computing device 2002. Resources 2018 can also include services provided over the Internet and/or through a subscriber network, such as a cellular or Wi-Fi network.

The platform 2016 may abstract resources and functions to connect the computing device 2002 with other computing devices. The platform 2016 may also serve to abstract scaling of resources to provide a corresponding level of scale to encountered demand for the resources 2018 that are implemented via the platform 2016. Accordingly, in an interconnected device embodiment, implementation of functionality described herein may be distributed throughout the system 2000. For example, the functionality may be implemented in part on the computing device 2002 as well as via the platform 2016 that abstracts the functionality of the cloud 2014. As such, cloud-based clusters such as those described above can be provided by platform 2016.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

Note that, although separate embodiments are discussed herein, any combination of embodiments and/or partial embodiments discussed herein may be combined to form further embodiments.

Conclusion

The various embodiments describe multi-site cluster-based data intake and query systems, including cloud-based data intake and query systems. Using a hybrid search system that includes cloud-based data intake and query systems working in concert with so-called "on-premises" data intake and query systems can promote the scalability of search functionality. In addition, the hybrid search system can enable data isolation in a manner in which sensitive data is maintained "on premises" and information or data that is not sensitive can be moved to the cloud-based system. Further, the cloud-based system can enable efficient leveraging of data that may already exist in the cloud.

In addition, various embodiments enable configuration data associated with search functionality to be shared amongst clusters in a manner that promotes cluster security. Specifically, a shared data store can be utilized to store configuration information such that when a particular cluster wishes to use the configuration information, it simply retrieves the configuration information from the shared data store, thus avoiding direct communication with other clusters.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
accessing, by a first cluster of a multi-site data intake and query system, a search configuration that defines at least a portion of how the first cluster retrieves or displays search results, the multi-site data intake and query system comprising the first cluster, a second cluster, and a shared storage location outside the first and second clusters, wherein the first cluster is an on-premises cluster and the second cluster is a cloud-based cluster;
synchronizing, by a first synchronization process that is not triggered by search processing, the search configuration from the first cluster to the shared storage location through a first firewall associated with the first cluster; and
synchronizing, by a second synchronization process that is not triggered by search processing, the search configuration from the shared storage location to the second cluster through a second firewall associated with the second cluster, thereby updating the second cluster based on the search configuration.

2. The computer-implemented method of claim 1, wherein the search configuration comprises a lookup table configured to enrich data retrieved from a search query.

3. The computer-implemented method of claim 1, wherein the search configuration comprises extraction rules defining fields of a schema for searching data.

4. The computer-implemented method of claim 1, wherein the first and second synchronization processes cause the search configuration to be communicated from the first cluster to the second cluster through the shared storage location, and wherein the first and the second clusters are configured to disallow incoming connections.

5. The computer-implemented method of claim 1, wherein the first and second synchronization processes cause the search configuration to be communicated from the first cluster to the second cluster without direct communication between the first and second clusters.

6. The computer-implemented method of claim 1, the cloud-based cluster residing in a hosted web service.

7. The computer-implemented method of claim 1, wherein the shared storage location is accessible by a third cluster configured to access the search configuration from the shared storage location.

8. The computer-implemented method of claim 1, wherein a first search head of the first cluster is configured to cause the synchronizing of the search configuration from the first cluster to the shared storage location.

9. The computer-implemented method of claim 1, wherein the search configuration is configured as read-only.

10. The computer-implemented method of claim 1, wherein the search configuration comprises at least one of saved searches, event types, transactions, tags, field extractions, field transforms, lookups, workflow actions, search commands, or views.

11. One or more non-transitory computer-readable media storing instructions thereon, the instructions, when executed by one or more processors, cause the one or more processors to perform operations comprising:
accessing, by a first cluster of a multi-site data intake and query system, a search configuration that defines at least a portion of how the first cluster retrieves or displays search results, the multi-site data intake and query system comprising the first cluster, a second cluster, and a shared storage location outside the first and second clusters, wherein the first cluster is an on-premises cluster and the second cluster is a cloud-based cluster;
synchronizing, by a first synchronization process that is not triggered by search processing, the search configuration from the first cluster to the shared storage location through a first firewall associated with the first cluster; and
synchronizing, by a second synchronization process that is not triggered by search processing, the search configuration from the shared storage location to the second cluster through a second firewall associated with the second cluster, thereby updating the second cluster based on the search configuration.

12. The one or more non-transitory computer-readable media of claim 11, wherein the search configuration comprises a lookup table configured to enrich data retrieved from a search query.

13. The one or more non-transitory computer-readable media of claim 11, wherein the search configuration comprises extraction rules defining fields of a schema for searching data.

14. The one or more non-transitory computer-readable media of claim 11, wherein the first and second synchronization processes are configured to cause the search configuration to be communicated from the first cluster to the second cluster through the shared storage location, and wherein the first and the second clusters are configured to disallow incoming connections.

15. The one or more non-transitory computer-readable media of claim 11, wherein the first and second synchronization processes are configured to cause the search configuration to be communicated from the first cluster to the second cluster without direct communication between the first and second clusters.

16. The one or more non-transitory computer-readable media of claim 11, the cloud-based cluster residing in a hosted web service.

17. The one or more non-transitory computer-readable media of claim 11, wherein the shared storage location is accessible by a third cluster configured to access the search configuration from the shared storage location.

18. The one or more non-transitory computer-readable media of claim 11, wherein a first search head of the first cluster is configured to cause the synchronizing of the search configuration from the first cluster to the shared storage location.

19. The one or more non-transitory computer-readable media of claim 11, wherein the search configuration is configured as read-only.

20. The one or more non-transitory computer-readable media of claim 11, wherein the search configuration comprises at least one of saved searches, event types, transactions, tags, field extractions, field transforms, lookups, workflow actions, search commands, or views.

21. A computer-implemented system comprising:
   one or more processors and memory storing instructions that, when executed by the one or more processors, cause the one or more processors to perform operations comprising:
      accessing, by a first cluster of a multi-site data intake and query system, a search configuration that defines at least a portion of how the first cluster retrieves or displays search results, the multi-site data intake and query system comprising the first cluster, a second cluster, and a shared storage location outside the first and second clusters, wherein the first cluster is an on-premises cluster and the second cluster is a cloud-based cluster;
      synchronizing, by a first synchronization process that is not triggered by search processing, the search configuration from the first cluster to the shared storage location through a first firewall associated with the first cluster; and
      synchronizing, by a second synchronization process that is not triggered by search processing, the search configuration from the shared storage location to the second cluster through a second firewall associated with the second cluster, thereby updating the second cluster based on the search configuration.

22. The computer-implemented system of claim 21, wherein the search configuration comprises a lookup table configured to enrich data retrieved from a search query.

23. The computer-implemented system of claim 21, wherein the search configuration comprises extraction rules defining fields of a schema for searching data.

24. The computer-implemented system of claim 21, wherein the first and second synchronization processes are configured to cause the search configuration to be communicated from the first cluster to the second cluster through the shared storage location, and wherein the first and the second clusters are configured to disallow incoming connections.

25. The computer-implemented system of claim 21, wherein the first and second synchronization processes are configured to cause the search configuration to be communicated from the first cluster to the second cluster without direct communication between the first and second clusters.

26. The computer-implemented system of claim 21, the cloud-based cluster residing in a hosted web service.

27. The computer-implemented system of claim 21, wherein the shared storage location is accessible by a third cluster configured to access the search configuration from the shared storage location.

28. The computer-implemented system of claim 21, wherein a first search head of the first cluster is configured to cause the synchronizing of the search configuration from the first cluster to the shared storage location.

29. The computer-implemented system of claim 21, wherein the search configuration is configured as read-only.

30. The computer-implemented system of claim 21, wherein the search configuration comprises at least one of saved searches, event types, transactions, tags, field extractions, field transforms, lookups, workflow actions, search commands, or views.

* * * * *